(12) United States Patent
Wheeler et al.

(10) Patent No.: US 8,643,951 B1
(45) Date of Patent: Feb. 4, 2014

(54) GRAPHICAL MENU AND INTERACTION THEREWITH THROUGH A VIEWING WINDOW

(75) Inventors: Aaron Joseph Wheeler, San Francisco, CA (US); Alejandro Kauffmann, San Francisco, CA (US); Liang-Yu (Tom) Chi, San Francisco, CA (US); Hayes Solos Raffle, Palo Alto, CA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 13/421,709

(22) Filed: Mar. 15, 2012

(51) Int. Cl.
*G02B 27/14* (2006.01)
(52) U.S. Cl.
USPC .......................................................... 359/630
(58) Field of Classification Search
USPC ................................................. 359/630–632
See application file for complete search history.

(56) References Cited

U.S. PATENT DOCUMENTS

| | | |
|---|---|---|
| 5,742,263 A | 4/1998 | Wang et al. |
| 6,061,064 A | 5/2000 | Reichlen |
| 6,084,556 A | 7/2000 | Zwern |
| 6,127,990 A | 10/2000 | Zwern |
| 6,198,462 B1 | 3/2001 | Daily et al. |
| 6,288,704 B1 | 9/2001 | Flack et al. |
| 6,359,603 B1 | 3/2002 | Zwern |
| 6,396,497 B1 | 5/2002 | Reichlen |
| 6,445,364 B2 | 9/2002 | Zwern |
| 6,847,336 B1 | 1/2005 | Lemelson et al. |
| 7,190,378 B2 | 3/2007 | Sauer et al. |
| 7,199,934 B2 | 4/2007 | Yamasaki |
| 7,365,734 B2 | 4/2008 | Fateh et al. |

(Continued)

FOREIGN PATENT DOCUMENTS

| | | |
|---|---|---|
| EP | 2211224 A1 | 7/2010 |
| JP | 8111878 | 4/1996 |

(Continued)

OTHER PUBLICATIONS

Sanders-Reed et al., "Enhanced and Synthetic Vision System (ESVS) Flight Demonstration," SPIE Digital Library, Mar. 19, 2008, pp. 1, 5, 6, and 8, Proc. SPIE 6957, 695701 (2008), doi:10.1117/12.775910, Orlando, FL, USA.
Hine et al., "VEVI: A Virtual Environment Teleoperations Interface for Planetary Exploration," University of California, Berkely, SAE 25th International Conference on Environmental Systems, Jul. 1995, p. 8-10, San Diego, CA, USA.
Sowizral and Nadeau, "Introduction to Programming with Java 3D," Java 3D Tutorial Notes, 1999, pp. 332, 344, and 352, Palo Alto, CA, USA.

*Primary Examiner* — Scott J Sugarman
*Assistant Examiner* — Mustak Choudhury
(74) *Attorney, Agent, or Firm* — McDonnell Boehnen Hulbert & Berghoff LLP

(57) ABSTRACT

Methods and systems involving a navigable area in a head-mounted display (HMD) are disclosed herein. An exemplary system may be configured to: (a) cause a head-mounted display (HMD) to provide: (i) a viewing window that is fully visible in a field of view of the HMD, (ii) a navigable area that is not fully visible in a field of view of the HMD such that the viewing window displays a first portion of the navigable area, and (iii) a media object that is associated with a viewing-window state; (b) receive first head-movement data that is indicative of head movement from a first position of the HMD to a second position of the HMD; and (c) based on (i) the first head-movement data and (ii) the viewing-window state, cause the viewing window to display a second portion of the navigable area which includes the media object.

25 Claims, 18 Drawing Sheets

(56) References Cited

U.S. PATENT DOCUMENTS

| | | |
|---|---|---|
| 7,647,175 B2 | 1/2010 | Fateh |
| RE42,336 E | 5/2011 | Fateh et al. |
| 7,948,451 B2 | 5/2011 | Gustafsson et al. |
| 2003/0020707 A1 | 1/2003 | Kangas et al. |
| 2005/0206583 A1 | 9/2005 | Lemelson et al. |
| 2006/0012884 A1 | 1/2006 | Snorteland et al. |
| 2007/0011609 A1 | 1/2007 | Adjouadi et al. |
| 2008/0276196 A1* | 11/2008 | Tang .............................. 715/800 |
| 2009/0231687 A1 | 9/2009 | Yamamoto |
| 2011/0052009 A1 | 3/2011 | Berkovich et al. |
| 2011/0213664 A1 | 9/2011 | Osterhout et al. |
| 2011/0227820 A1* | 9/2011 | Haddick et al. ............... 345/156 |
| 2013/0139082 A1 | 5/2013 | Wheeler |

FOREIGN PATENT DOCUMENTS

| | | |
|---|---|---|
| KR | 20030024021 | 3/2003 |
| KR | 100751290 | 8/2007 |
| WO | 2010057304 A1 | 5/2010 |
| WO | 2010118292 A1 | 10/2010 |
| WO | 2011097226 A1 | 8/2011 |

* cited by examiner

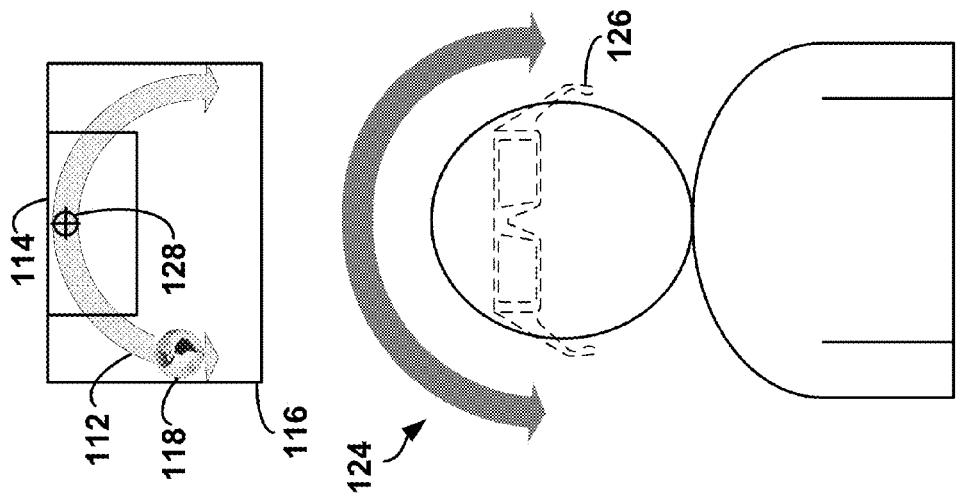
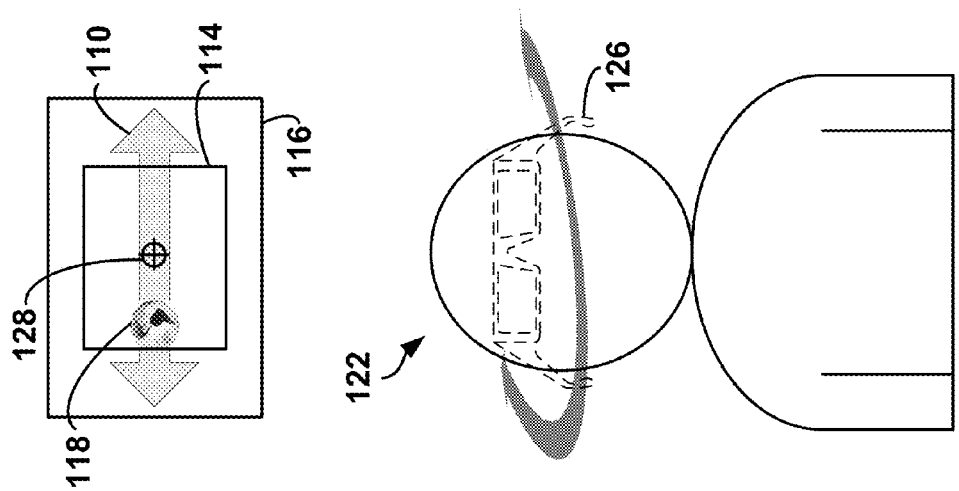
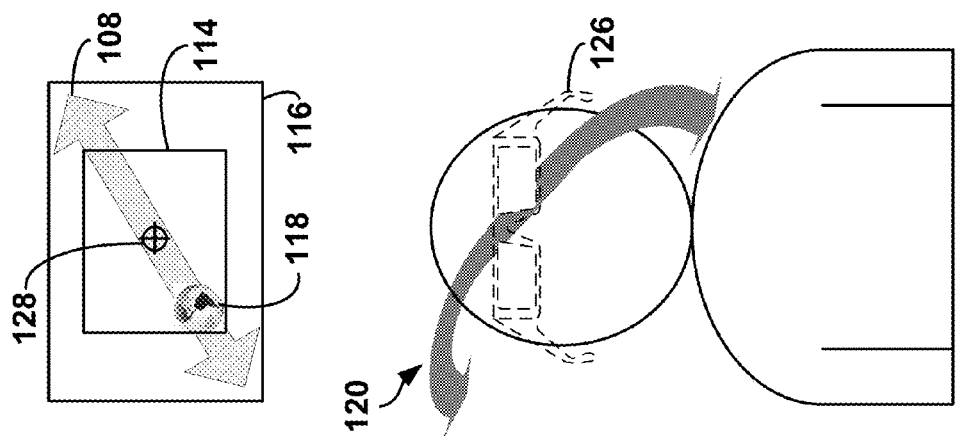

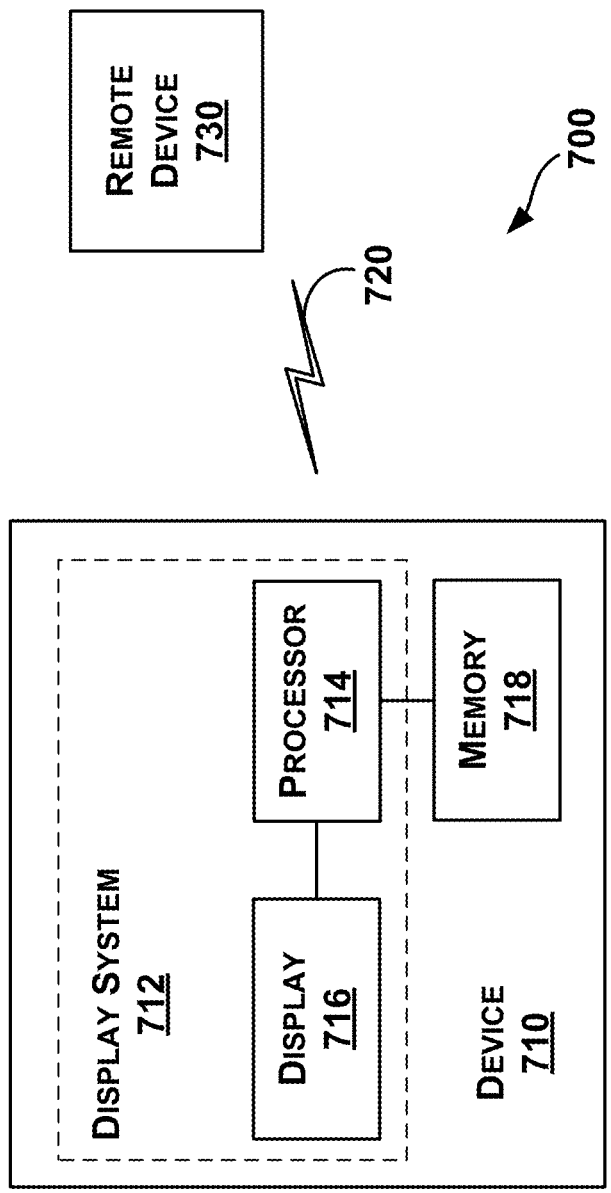

GRAPHICAL MENU AND INTERACTION THEREWITH THROUGH A VIEWING WINDOW

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices provide information to users is becoming more intelligent, more efficient, more intuitive, and/or less obtrusive.

Additionally, a trend toward miniaturization of computing hardware, peripherals, as well as sensors, detectors, and image and audio processors, among other technologies, has helped open up a field sometimes referred to as "wearable computing." In the area of image and visual processing and production, in particular, it has become possible to consider wearable displays that place a relatively small image display element close enough to a wearer's (or user's) eye(s) such that the displayed image fills or nearly fills the user's field of view, and appears as a normal sized image, such as might be displayed on a traditional image display device. The relevant technology may be referred to as "near-eye displays."

Near-eye displays are fundamental components of wearable computers with displays, also sometimes called "head-mounted displays" (HMDs). Emerging and anticipated uses of near-eye displays may advantageously provide seamless use of a wearable computer. However, several challenges may arise as a result of the limited dimensions of the near-eye display, especially when viewing, searching, and/or browsing large amounts of information. Such limited dimensions of the near-eye display may make such uses of the wearable computer burdensome. Therefore, an improvement is desired.

SUMMARY

Modern portable computing systems, including wearable computing systems, are commonly limited, at least in one respect, by the manner in which they are used or controlled. For example, some methods for interacting with a wearable computer with a head-mounted display (HMD) involve the user controlling the computer by way of body-movements.

The systems and methods described herein may help provide for more convenient, efficient, and/or intuitive interactions with such computing systems. In one example embodiment, a system is provided. The system includes: (1) a non-transitory computer readable medium; (2) program instructions stored on the non-transitory computer readable medium and executable by at least one processor to: (a) cause a head-mounted display (HMD) to provide: (i) a viewing window that is fully visible in a field of view of the HMD, (ii) a navigable area that is not fully visible in a field of view of the HMD such that the viewing window displays a first portion of the navigable area, and (iii) at least one media object that is associated with at least one viewing-window state; (b) receive first head-movement data that is indicative of head movement from a first position of the HMD to a second position of the HMD; and (c) based on at least (i) the first head-movement data and (ii) the at least one viewing-window state associated with the at least one media object, cause the viewing window to display a second portion of the navigable area which includes the at least one media object.

An example embodiment may involve a wearable computing system, such as an HMD, that continuously collects information about the user's body-movements (e.g., via sensors such as accelerometers, gyroscopes, and other input devices), and responsively outputs a viewing window that displays a portion of a navigable area (e.g., via the HMD). Such an embodiment may include an HMD with rich sensors to closely track the body-movements of the user. For example, an embodiment may include the entirety of the computing system within the HMD itself and/or may be networked with other computer systems for tracking such body-movements. Other examples and variations, some of which are discussed herein, are possible as well.

In a further aspect, a computer-implemented method is provided. The method involves: (1) causing a head-mounted display (HMD) to provide: (a) a viewing window that is fully visible in a field of view of the HMD, (b) a navigable area that is not fully visible in a field of view of the HMD such that the viewing window displays a first portion of the navigable area, and (c) at least one media object that is associated with at least one viewing-window state; (2) receiving first head-movement data that is indicative of head movement from a first position to a second position; and (3) based on at least (a) the first head-movement data and (b) the at least one viewing-window state associated with the at least one media object, causing the viewing window to display a second portion of the navigable area which includes the at least one media object.

In yet a further aspect, a non-transitory computer-readable medium is provided. The non-transitory computer-readable medium includes instructions comprising: (1) instructions for causing a head-mounted display (HMD) to provide: (a) a viewing window that is fully visible in a field of view of the HMD, (b) a navigable area that is not fully visible in a field of view of the HMD such that the viewing window displays a first portion of the navigable area, and (c) at least one media object that is associated with at least one viewing-window state; (2) instructions for receiving first body-movement data that is indicative of body movement from a first position to a second position; and (3) instructions for, based on at least (a) the first body-movement data and (b) the at least one viewing-window state associated with the at least one media object, causing the viewing window to display a second portion of the navigable area, wherein the second portion includes the at least one media object.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 1B, 1C, and 1D illustrate body-movement data indicative of body movement, according to an exemplary embodiment.

FIG. 7 shows a simplified block diagram of an example computer network infrastructure, according to an exemplary embodiment.

DETAILED DESCRIPTION

Figure 1A:
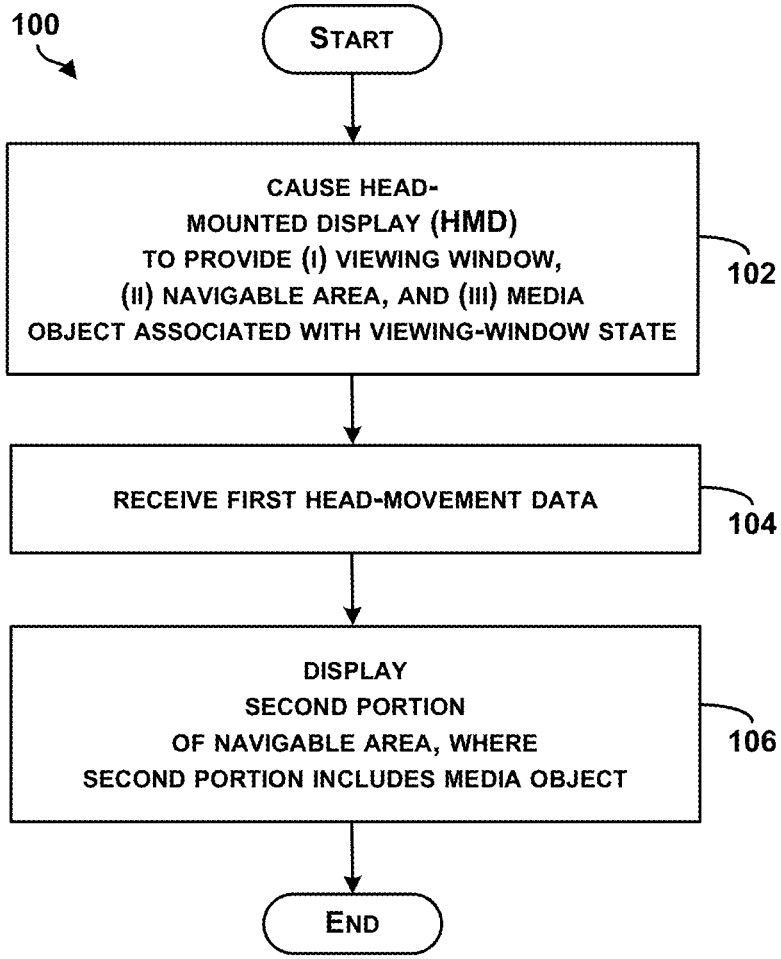
FIG. 1A is a flow chart illustrating a method of interacting with a viewing window, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. The exemplary embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

A. Overview

An exemplary embodiment involves a wearable computer that may be configured to receive input data from head- and/or eye-movements of a user and responsively output the movement of a viewing window throughout a larger navigable area shown on a graphical display (e.g., a head-mounted display (HMD)). The viewing window may be configured to display only a portion of the navigable area and to hover or pan within the navigable area in response to certain gestures (e.g., movement of the head and/or eyes.) In such a case, a viewing window may provide a wearer of the HMD with the sensation of looking through a viewing window into a much larger virtual world.

For example, an exemplary embodiment may allow a user of the wearable computer to search through a large navigable area using head-movements. A user wearing the computer and originally positioned so as to be looking in a forward direction, may simply look up and the wearable computer may responsively move a viewing window in an upward (e.g., northern) direction while panning along the navigable area. While moving, the user may observe various media objects positioned in the navigable area as the viewing window passes over them. The user may then look to the right and the wearable computer may responsively change the direction of the viewing window to move in a direction to the right (e.g., east) while continuing to pan along the navigable area.

While panning, the user may hover over various other media objects, allowing the user to browse for a desired media object. After spotting a desired media object, the user may then look in the forward direction (as originally positioned) to stop panning along the navigable area. The wearable computer may responsively stop the movement of the viewing window such that the media object is within the viewing window. The user may then make further head-movements to center the viewing window over the media object. Further, the user may initiate an action with the media object such as selecting and/or opening the media object. In some instances, once the media object is in the viewing window, the viewing window may center over the media object without any further incremental head-movements made by the user.

In another example, consider again a user wearing the computer and situated so as to be looking in a forward direction. However, in this scenario, consider a media object in the shape of a horizontal rail, which due to its extensive length in the navigable area, is only partly visible within the viewing window. In some instances, such a horizontal rail may be fully visible or perhaps not visible at all within the viewing window. In any case, the user may make incremental head-movements to "lock on" to the rail and thereafter, the user may look to the left. Instantaneously, the viewing window may launch in a direction to the left (e.g., west) in the navigable area while travelling in a straight line along the rail. In addition, while moving on the rail, the viewing window may come across a media object situated on the rail and the viewing window may stop to provide the user with an opportunity to view the media object. The user may then look in the forward direction to view the media object. If uninterested in the media object, the user may resume the search by again looking to the left, re-launching the movement of the viewing window to the left in the navigable area.

Further, consider that the rail may make a sharp left turn and heads downward (e.g., south) along the navigable area. Once the viewing window reaches this turn, the viewing window may stop. The user may look in forward direction and then downward to continue moving along the rail south along the navigable area. The user may then continue searching for a desired media object.

It should be understood that the above application of an exemplary embodiment is provided for illustrative purposes, and is just one of many possible applications of an exemplary embodiments.

B. Exemplary Methods for Displaying a Viewing Window

FIG. 1A is a simplified flow chart illustrating a method for interacting with a viewing window, according to an exemplary embodiment. Method 100 is described, by way of example, as being carried out by a wearable computer and, in particular, by a wearable computer that includes an HMD. However, it should be understood that exemplary methods, such as method 100, may be carried out by devices other than a wearable computer, and/or may be carried out by subsystems in a wearable computer or in other devices. For example, an exemplary method may alternatively be carried out by a device such as a mobile phone, which is configured to simultaneously display a media object in a navigable area and a point-of-view video feed in a physical-world window. Other examples are also possible.

Example method 100 may be used to provide a navigable area and allow a user to navigate, via head movements, within the navigable area and/or interact with the navigable area via the viewing window. The navigable area may generally be "larger" than the viewing window.

Exemplary method 100 involves, as shown by block 102, causing a head-mounted display (HMD) to provide (i) a viewing window that is fully visible in a field of view of the HMD, (ii) a navigable area that is not fully visible in a field of view of the HMD, where the viewing window displays a first portion of the navigable area, and (iii) at least one media object, where the at least one media object is associated with at least one viewing-window state.

For example, in FIGS. 1B, 1C, and 1D, an exemplary HMD provides viewing window 114 that is fully visible in the field of view of the HMD. Further, navigable area 116 is not fully visible in a field of view of the HMD and viewing window 114 displays a first portion of the of navigable area 116 and media object 118. Yet further, pointer 128 is located in the center of viewing window 114.

Viewing window 114 may be smaller than the field of view of a wearer of the HMD, however, in some embodiments, viewing window 114 may also be the same as the field of view of the wearer. In some instances, viewing window 114 may be provided through lens elements of an HMD so as to create a virtual reality of looking through viewing window 114 into a much larger navigable area 116. The user may be able to view the navigable area 116 through viewing window 114, whereas a peripheral view of the real-world may also be preserved.

In some embodiments, viewing window 114 may include pointer 128 (e.g., a cursor, indicator, reticle, or other pointing icon.) Pointer 128 may be fixed within the center of viewing window 114 and/or may be controlled independently of viewing window 114 through further input data (e.g., human-interface device and/or body movements of a user.) In some embodiments, the head- and/or eye-movements can be used to move pointer 128 over media object 118 shown on navigable area 116, perhaps resulting in a selection of media object 118. Further, once pointer 128 is positioned over media object 118, the computing system may respond. For example, in some embodiments, positioning pointer 128 over media object 118 may indicate an intended action (e.g., an indication of selecting media object 118.)

For purposes of explanation, a navigable area may function similar to a desktop on a personal computer, a pointer may operate similar to a mouse pointer, and a graphical object may operate much like a desktop icon. However, such a comparison of aspects of the disclosure herein to other known computing systems is for purposes of example only, and should not be taken to be limiting. Other comparisons, possibilities, and/or examples may exist as well.

Further, exemplary method 100 involves receiving first head-movement data, as shown by block 104. In some embodiments, exemplary method 100 involves receiving first head-movement data that is indicative of head movement from a first position to a second position. The first head-movement data may be indicative of sensed movements of the head or eyes of a wearer of the wearable computer. In some embodiments, sensory configurations may be used in combination with a wearable computer to receive the first head-movement data that is indicative of head- and/or eye-movement. Sensors may be mounted on the wearable computer or provided on other parts of the wearable to include more than one type of sensor device or element.

By way of example and without limitation, example sensors could be any one or more of a motion detector (e.g., a gyroscope, an accelerometer, a camera, and/or a shock sensor), an impact sensor, a contact sensor (e.g., capacitive sensing device), a location determination device (e.g., a GPS device), a magnetometer, and an orientation sensor (e.g., a theodolite). Other detection devices or elements may be included within these sensors and other functions may be performed by these sensors. Sensors that may be included in an example computing system are discussed further below with respect to FIGS. 5A and 9A.

The first head-movement data may be indicative of a head-movement from a first position to a second position. A first position may be an initial position of the wearable computer after placing the wearable computer on to a wearer. However, in some instances, the first position may be an initial position of the wearable computer after a calibration process was performed by the wearer. Further, in some instances, a first position may be the position of the wearable computer after authenticating the wearer. Other possibilities may exist—as a general matter, the first position may be any position that the wearable computer is in upon commencement of method 100.

The second position may generally be any position other than the first position of the wearable computer. For example, the aforementioned sensory configurations in a wearable computer may determine the difference between the first position of the wearable computer and the second position of the wearable computer by detecting head- and/or eye-movements. In some instances, an accelerometer may track head-movements to determine the first position and the second position of the wearable computer.

Yet further, exemplary method 100 involves displaying a second portion of the navigable area, where the second portion includes the media object, as shown by block 106. This may involve (i) receiving head-movement data and (ii) determining that the at least one viewing-window state is associated with the at least one media object.

Figure 1E:
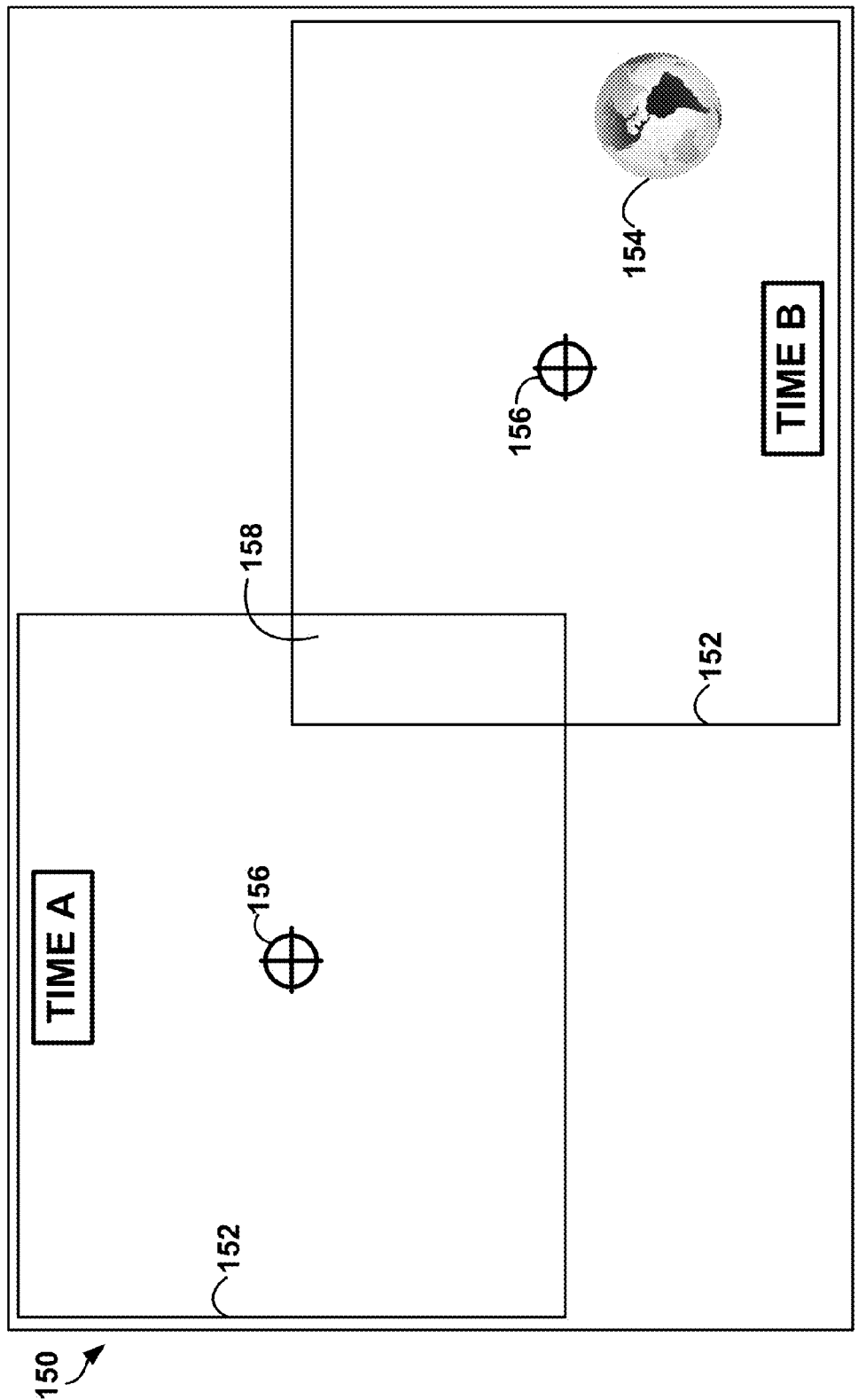
FIG. 1E illustrates movement of a viewing window in a navigable area, according to an exemplary embodiment.

For example, FIG. 1E illustrates displaying a second portion of navigable area, where the second portion includes a media object. In FIG. 1E, viewing window 152 includes pointer 156 and is shown at time A, displaying a first portion of navigable area 150. At some later time B, viewing window 152 displays a second portion of graphic menu 150, where the second portion includes media object 154. In this example, the position of viewing window 152 at time A overlaps the position of viewing window 152 at time B, where the overlap is illustrated in FIG. 1E by area 158. In some instance, there may be no overlap 158 at all.

Referring back to the examples in FIGS. 1B, 1C, and 1D, exemplary head movements corresponding to head-movement data are illustrated. In FIG. 1B, wearable computer 126 may include a variety of sensory configurations to receive head-movement data from diagonal head-movement 120. Based on diagonal head-movement 120, a second portion of the navigable area may be displayed such that media object 118 is displayed. Similarly, in FIG. 1C, wearable computer 126 may utilize a variety of sensory configurations to receive head-movement data from horizontal head-movement 122. Based on horizontal head-movement 126, a second portion of the navigable area may be displayed such that media object 118 is displayed. Yet further, in FIG. 1D, wearable computer 126 may utilize a variety of sensory configurations to receive head-movement data from peripheral head-movement 124. Based on peripheral head-movement 124, a second portion of the navigable area may be displayed such that media object 118 is displayed.

Other movements of the wearable computer are possible, including any combination of those movements described with respect to FIGS. 1B, 1C, and 1D. Further, the wearable computer may utilize a variety of sensory configurations to receive such data.

C. Exemplary Methods for Interacting with a Viewing Window (Gravity Well)

In one embodiment, the viewing window may have a viewing-window state. In one exemplary embodiment, a viewing-window state may effect the movement of the viewing window. In some instances, a viewing-window state may cause the viewing window to move towards or away from a media object. Further, in some instances, a viewing window state may change the relationship between head- and/or eye-movements of the HMD and the movement of the viewing window. It should be understood that the above examples are provided for illustrative purposes, and are just a few of many possible functions of a viewing window state.

The viewing-window state may be initiated in accordance with a particular media object provided in the viewing window. A viewing-window state may be a gravity-viewing-window state. A gravity-viewing-window state may have a "gravitational" effect on a viewing window, pulling the viewing window in a direction towards a particular media object. In some instances, the "gravitational" effect may cause a pointer in the viewing window to position over the media object, possibly selecting the media object. The gravitational pull may be "strong" enough to account for and/or overcome any natural jitter of the wearer's head and body to seamlessly select a media object. To deselect the media object or move away from the object's gravitational pull, a predetermined gesture (e.g., a specific movement of the HMD) may be required to move the pointer away from the media object and overcome the object's "gravitational pull."

Figure 2A:
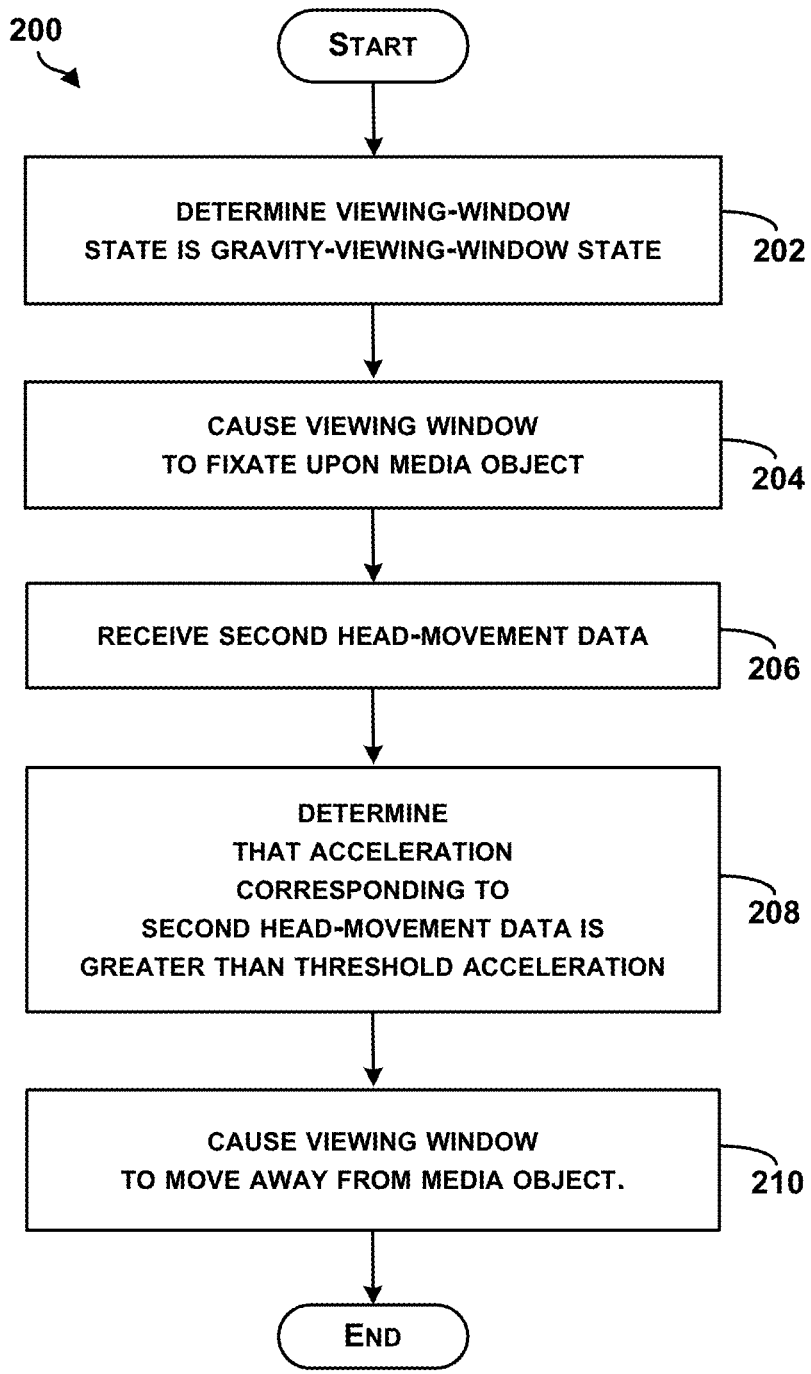
FIG. 2A is a flow chart illustrating an additional method of interacting with a viewing window, according to an exemplary embodiment.

FIG. 2A is a simplified flow chart illustrating a method interacting with a viewing window having a gravity-viewing window state, according to an exemplary embodiment. Method 200 is described by way of example as being carried out by a wearable computer, and in particular, by a wearable computer that includes an HMD. However, it should be understood that exemplary methods, such as method 200, may be carried out by devices other than a wearable computer, and/or may be carried out by sub-systems in a wearable computer or in other devices. For example, an exemplary method may alternatively be carried out by a device such as a mobile phone, which is configured to simultaneously display a media object in a navigable area and a point-of-view video feed in a physical-world window. Other examples are also possible. An exemplary method may be used to provide a navigable area and allow a user to navigate, via head movements, within and/or interact with a navigable area, which is generally larger than the viewing window.

i. Determining a Gravity-Viewing-Window State

In FIG. 2A, exemplary method 200 involves determining at least one viewing-window state is a gravity-viewing-window state associated with a media object, as shown by block 202. A media object may be selected once a viewing window and/or a pointer in the viewing window positions over the media object. However, some media objects may be small or irregularly shaped, making it difficult to position the pointer on to those particular media objects. In some instances, natural jitter from body movement may also be a significant factor, making it particularly challenging to position the pointer over the media object. To overcome such difficulties, a gravity-viewing-window state may be determined. A gravity-viewing-window state may be implemented for other purposes as well.

Figure 2B:
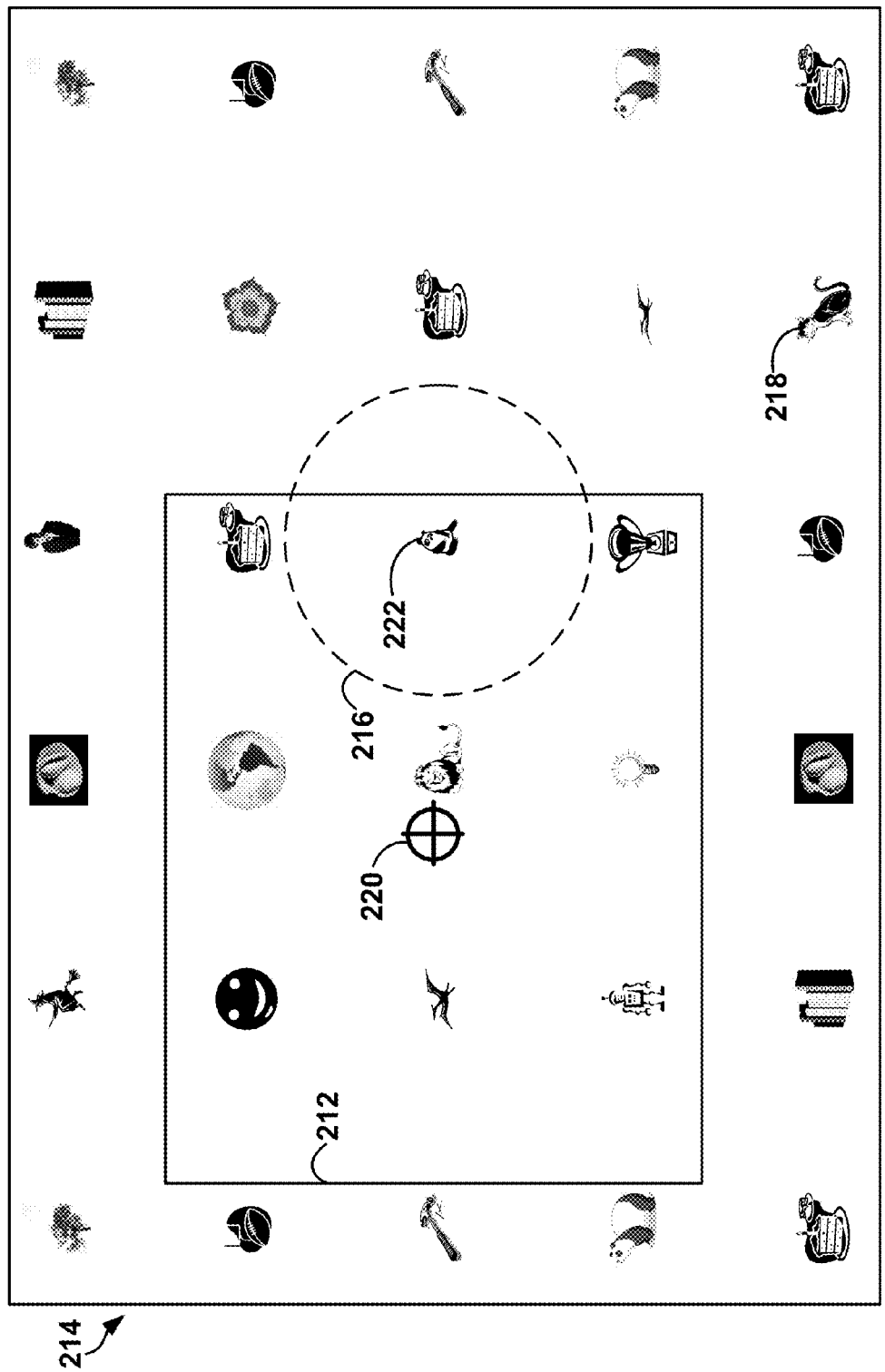
FIG. 2B illustrates displaying a viewing window in a navigable area, according to an exemplary embodiment.

For example, consider FIG. 2B illustrating a gravity-viewing-window state in a navigable area, according to an exemplary embodiment. FIG. 2B also illustrates multiple media objects being displayed on the navigable area, some of which are visible to a wearer of a wearable computer with an HMD. Referring back to FIG. 1E, media objects may or may not be visible depending on the position of the viewing window. For example, in FIG. 1E, at time A, no media objects are visible through viewing window 152. However, at time B, after viewing window 152 has moved, graphic object 154 is visible to the wearer. In FIG. 2B, some but not all of the media objects are visible through viewing window 212, and the embodiment may provide a user with the sensation of looking through a window at a portion of a much larger navigable area 214.

Note that, in FIG. 2B, media object 222 is smaller than many of the other media objects. To compensate for its size and the potential difficulty in moving pointer 220 over media object 222, a gravity-viewing-window state may be determined. Similarly, to prevent potential complications in selecting media object 218 due to its irregular shape, viewing window 212 may also determine a gravity-viewing-window state associated with media object 218. Such a gravity-viewing-window state may also be determined for any other media object, regardless of the media object's size.

In some embodiments, a gravity-viewing-window state may be determined based on the position of the viewing window. For example, in FIG. 2B, navigable area 214 may include a fixed grid system such that viewing window 212 may be defined by a specific set of (x, y) coordinates on navigable area 214. Further, this specific set of (x, y) coordinates may change as viewing window 212 moves within navigable area 302. In addition, media object 222 may also have a set of (x1 . . . xn, y1 . . . yn) coordinates that define gravity area 216 relative to media object 222. Further, it may be determined that the set of coordinates (x, y) for viewing window 212 match with some or all of the coordinates (x1 . . . xn, y1 . . . yn) defining gravity area 216. In response to such a match, the gravity-viewing-window state may be determined and the viewing window 212 may be gradually pulled towards media object 222, perhaps until pointer 220 is positioned directly over media object 222.

In some embodiments, a gravity-viewing-window state may be determined when the viewing window moves from viewing a first portion of the navigable area to a second portion, where the second portion includes a media object. For example, the first portion of the navigable area may be different from the second portion of the navigable area; but the two portions may, in some instances, overlap each other.

Further, the second position of the viewing window may include a media object associated with a gravity-viewing-window state. For example, viewing window 212 may move to a portion (as illustrated in FIG. 2B) such that media object 222 is included in viewing window 212. In response, the gravity-viewing-window state may be determined and pointer 220 may gravitate towards media object 222 until pointer 220 is positioned directly over media object 222, perhaps selecting media object 222.

ii. Causing the Viewing Window to Fixate

In FIG. 2A, exemplary method 200 further involves causing the viewing window to fixate upon the media object, as shown by block 204. In some embodiments, determining a viewing-window state is a gravity-viewing-window state associated with a media object may cause the viewing window to fixate upon the media object. For example, in FIG. 2B, upon determining the gravity-viewing-window state, viewing window 212 may fixate on media object 222.

In some embodiments, causing the viewing window to fixate may move the viewing window in a particular direction. For example, causing viewing window 212 to fixate may move viewing window 212 in a direction towards media object 222. Further, in some instances, causing viewing window 212 to fixate may involve continuing to move viewing window 212 towards media object 222 despite any natural jitter and/or inadvertent movements of a wearer that may otherwise move viewing window 212 away from media object 222. Causing viewing window 212 to fixate may be particularly useful when a wearer is having difficulties in selecting media objects due to involuntary body movements (e.g., tremors due to old age).

In some embodiments, causing the viewing window to fixate may position a pointer over a media object. For example, causing viewing window 212 to fixate may move viewing window 212 over media object 222 such that pointer 220 is positioned over media object 222. Further, additional head- and/or eye-movements may indicate a selection of media object 222. Additionally, a touchpad and/or keypad associated with the wearable computer may be utilized to initiate further actions such as selecting and/or opening the media object. Yet further, in some embodiments, causing viewing window 212 to fixate may move viewing window 212 over media object 222 such that pointer 220 is positioned over media object 222 and media object 222 may be selected without any further head- and/or eye-movements.

In some embodiments, causing viewing window to fixate may account for inadvertent eye- and/or head-movement. For instance, a wearer might use head-movements to move the pointer 220 over media object 222. Then, while pointer 220 is over media object 222, the wearer may blink or voice a command by saying "open" or "select" to open media object 222. In this example, involuntary head-movements caused by voicing the command may otherwise cause pointer 220 to move away from media object 222. However, causing viewing window 212 to fixate may account for such involuntary head-movements and maintain the position of pointer 220 over media object 222.

In some embodiments, causing the viewing window to fixate may account for inadvertent eye- and/or head-movement while initiating an action. In some instances, it may be beneficial to utilize an additional human-interface device (e.g., a touchpad and/or keypad) in combination with the eye- and/or head-movement control. For example, while head-movements may be used to move viewing window 212 and/or pointer 220 over media object 222, a touchpad mounted to the side of the wearable computer may be used to initiate the further action with media object 222. In some instances, a wearer may be more accustomed to the tactile feedback involved in using a touchpad as opposed to purely utilizing eye- and/or head-movements for controlling pointer 220 and initiating an action. However, involuntary head-movements caused by initiating an action through the touchpad (since it may be mounted to the side of the wearable computer) may cause pointer 220 to move away from media object 222. In this example, causing viewing window 212 to fixate may account for such involuntary head-movements to maintain pointer 220's position over media object 222.

iii. Receiving Second Head-Movement Data

In FIG. 2A, exemplary method 200 further involves receiving second head-movement data while the viewing window remains fixated upon the media object, as shown by block 206. In some embodiments, the gravity-viewing-window state may be removed from a viewing-window state by the second head-movement data. For example, in FIG. 2B, viewing window 212 may fixate and move towards media object 222, however, this fixation may be removed. Thus, in response to the head-movement data, second head-movement data may, in some instances, stop the fixation and interrupt the movement of viewing window 212 towards media object 222.

In some embodiments, the second head-movement data may be different than the first head-movement data as described in exemplary method 100. For example, the second head-movement data may correspond to a different head-movement direction than the first head-movement data.

For instance, consider again head movements corresponding to head-movement data illustrated in FIGS. 1C and 1D. First head-movement data may be illustrated in FIG. 1C such that wearable computer 126 may receive first head-movement data from horizontal head-movement 122. However, second head-movement data may be illustrated in FIG. 1D such that wearable computer 126 may receive second head-movement data from peripheral head-movement 124. As illustrated, the first head-movement data corresponds to a different direction in head movement (horizontal head-movement 122) than the second head-movement data (peripheral head-movement 124).

iv. Determining an Acceleration and Causing the Viewing Window to Move

In FIG. 2A, exemplary method 200 further involves determining that an acceleration corresponding to the second head-movement data is greater than a threshold acceleration, as shown by block 208. In some embodiments, a threshold acceleration may be required to remove the gravity-viewing-window state. In some instances, a threshold acceleration may include a specific direction of movement of the wearable computer. For example, in FIG. 1C, viewing window 114 may determine a gravity-viewing-window state associated with media object 118 such that viewing window 114 is fixating and/or moving towards media object 118. Further, data received from horizontal head-movement 122 of wearing wearable computer 126 may include a specific acceleration exceeding a threshold acceleration. In response to exceeding the predetermined acceleration, the gravity-viewing-window state may be removed from viewing window 116.

In FIG. 2A, exemplary method 200 further involves causing the viewing-window to move away from the media object, as shown by block 210. In some embodiments, removing the gravity-viewing-window state may include moving the viewing window away from the media object. For example, head-movement data received from the acceleration of head-movements may be compared with a threshold acceleration and once the threshold is exceeded, the viewing window may move away from media object. For example, with reference to FIG. 1D, viewing window 114 may determine a gravity-viewing-window state associated with media object 118 such that viewing window 114 is fixating or moving towards media object 118. Further, data received from peripheral head-movement 124 of wearable computer 126 may include an acceleration that exceeds a threshold acceleration and causes viewing window 114 to move away from media object 118.

In some embodiments, a threshold velocity may be required in addition to or separately from a threshold acceleration to remove a gravity-viewing-window state. In particular of these embodiments, exceeding a predetermined threshold velocity may remove a gravity-viewing-window state and/or move the viewing window away from the media object. Other possibilities may also exist.

D. Exemplary Methods for Interacting with a Viewing Window (Rail)

In some embodiments, a viewing-window state may be a rail-viewing-window state. For example, the rail-viewing-window state may be associated with a graphical object, such as a rail. However, the rail-viewing-window state need not be associated with a graphical object.

In some instances, the rail may be one-dimensional to provide an easily navigable linear array of other graphical objects adjacently positioned on the graphical display (i.e., along the rail). Once input-selection data is received to select the rail, the movement of the viewing window may be fixed along the rail such that head-movement data from the wearable computer causes the viewing window to "slide" along the rail.

Since selecting and viewing multiple media objects separately and/or individually may be cumbersome or time-consuming, a rail may provide for efficient and seamless viewing of multiple media objects over a short period of time. In some instances these media objects may be related in some way to further enhance a possible search of multiple media objects over a short period of time. Additionally, being fixed to the rail may overcome any unwanted natural jitter of the wearer's head and body. In this way, multiple media objects can be viewed rapidly to improve productivity and provide ease of use.

Figure 3A:
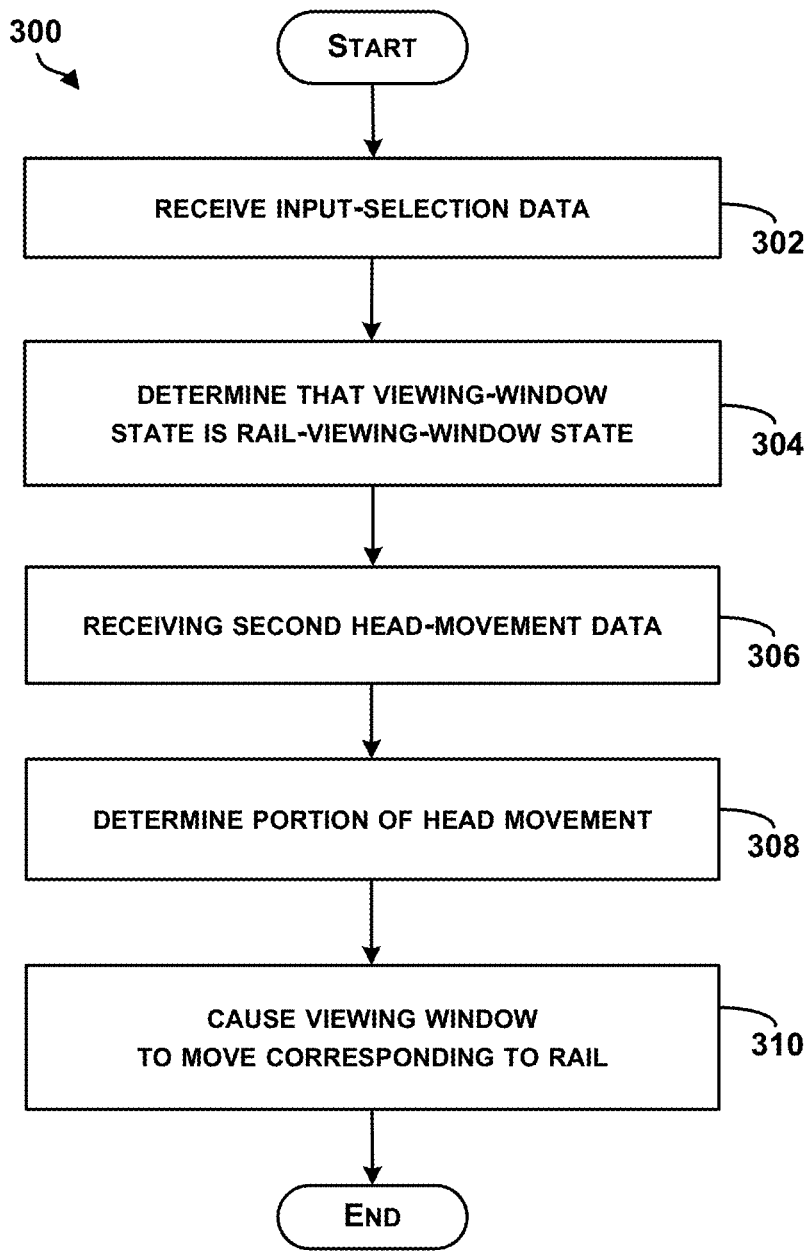
FIG. 3A is a flow chart illustrating an additional method of interacting with a viewing window, according to an exemplary embodiment.

FIG. 3A is a simplified flow chart illustrating a method for interacting with a rail-viewing-window state, according to an exemplary embodiment. Method 300 is described by way of example as being carried out by a wearable computer, and in particular, by a wearable computer that includes an HMD. However, it should be understood that exemplary methods, such as method 300, may be carried out by devices other than a wearable computer, and/or may be carried out by subsystems in a wearable computer or in other devices. For example, an exemplary method may alternatively be carried out by a device such as a mobile phone, which is configured to simultaneously display a media object in a navigable area and a point-of-view video feed in a physical-world window. Other examples are also possible. An exemplary method may be used to provide a navigable area and allow a user to navigate, via head movements, within and/or interact with a navigable area, which is typically larger than the viewing window.

i. Selecting a Media Object

In FIG. 3A, exemplary method 300 involves receiving input-selection data indicating a selection of at least one media object, as shown by block 302. Generally, input-selection data may be received when a viewing window and/or a pointer in the viewing window positions over the media object (e.g., by hovering over a media object such as a rail). However, other implementations are also possible.

Figure 3B:
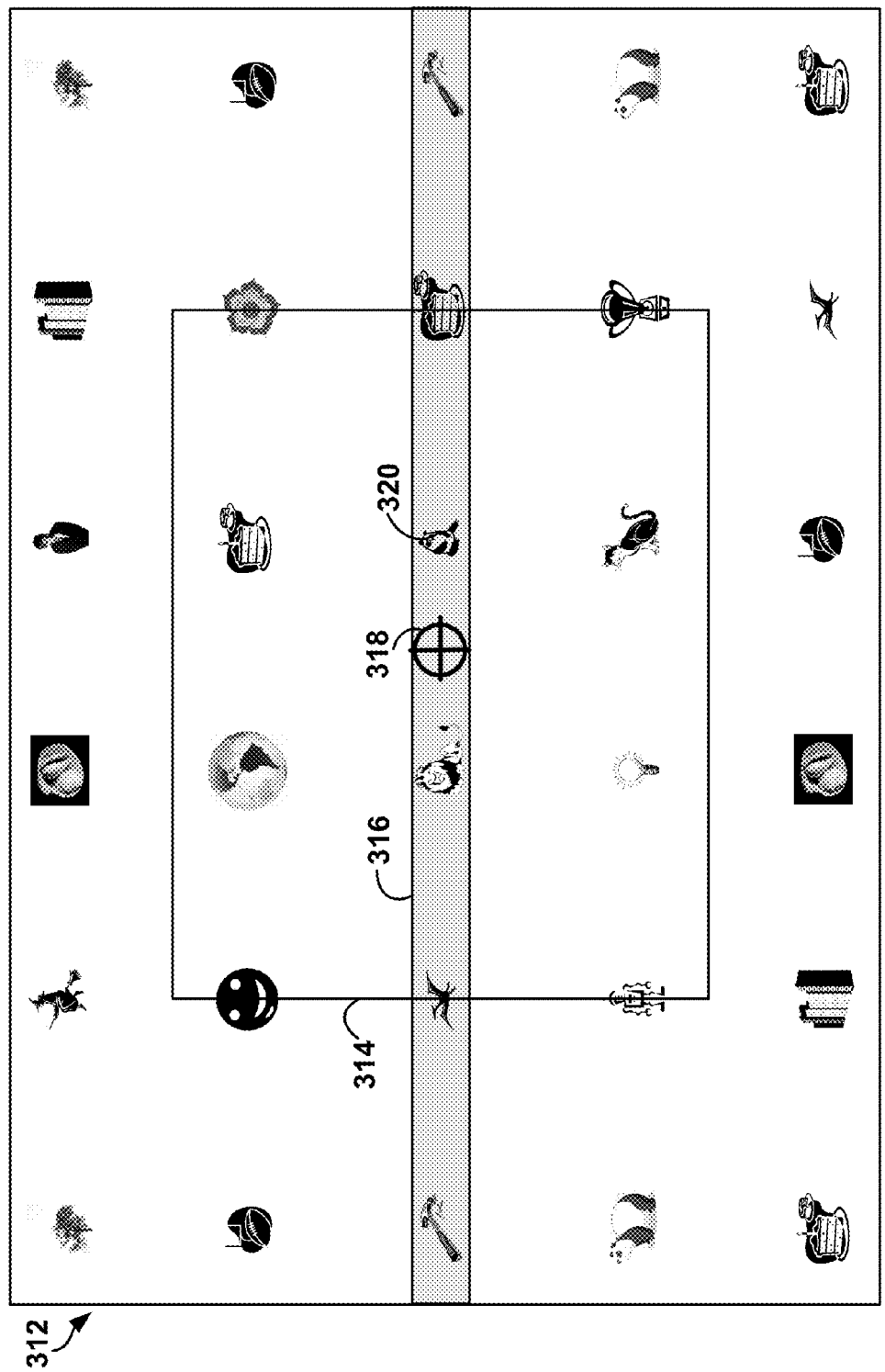
FIG. 3B illustrates selecting a rail, according to an exemplary embodiment.

In some embodiments, input-selection data may be received based on the positioning of the viewing window. For example, FIG. 3B illustrates selecting a rail, according to an exemplary embodiment. In FIG. 3B, navigable area 312 may include a fixed grid system such that pointer 318 may be defined by a specific set of (x, y) coordinates on navigable area 312. This specific set of (x, y) coordinates may change as pointer 318 moves within navigable area 312. In addition, horizontal rail 316 may also have a set of coordinates (x1 . . . xn, y1 . . . xn) that defines the area relative to horizontal rail 316. Further, it may be determined that the set of coordinates (x, y) for pointer 318 matches a portion of the coordinates (x 1 . . . xn, y1 . . . xn) defining horizontal rail 316. In response to such a match, input-selection data may be received and horizontal rail 316 may be selected. In some instances, horizontal rail 316 may be selected due to the match alone. Horizontal rail 316 may also be vertical and/or diagonal and defined by a different set of (x1 . . . xn, y1 . . . yn) coordinates, among other possibilities. Further, horizontal rail 316 may include small media objects such as media object 320 and/or other irregularly shaped media objects, to provide for seamless selection of such objects.

In some embodiments, input-selection data may be received when the pointer positions over the media object and stays motionless for a certain period of time. Further, in some embodiments, input-selection data may be received when the pointer positions over the media object and moves at a rate of movement less than a predetermined threshold. Yet further, in some embodiments, an action may be taken such that the wearable computer receives input-selection data indicating a selection. For example, gestures and/or body movements (e.g., indicative of sensed movements of the head or eyes of a user of the wearable computer) may provide an indication of selecting a media object. In some instances, a wearer of the wearable computer may provide an indication of selecting a media object through the use of a touch pad or key pad located on or remotely from the wearable computer. Further, in some instances, a user of the wearable computer may provide vocal signals providing for an input-selection data to select a media object. Other possibilities and combinations may also exist.

ii. Determining a Rail-Viewing-Window State

In FIG. 3A, based on the selection of at least one media object, exemplary method 300 further involves determining that at least one viewing-window state is a rail-viewing-window state associated with the selected media object, as shown by block 304. In some embodiments, a rail-viewing-window state may be determined when viewing window moves from viewing a first portion of the navigable area to a second portion which includes a media object associated with the rail-viewing-window state. For example, the first portion of the navigable area may be different that the second portion of the navigable area but the two portions may, in some instances, overlap each other.

In some embodiments, selecting a media object may determine a rail-viewing-window state. In particular of these embodiments, the media object may be a rail. For example, in FIG. 3B, consider that viewing window 314 and/or pointer 318 selects horizontal rail 316 positioned in navigable area 312. Based on selecting horizontal rail 316, viewing window 304 may determine a rail-viewing-window state such that viewing window 304 and pointer 308 are fixed along horizontal rail 316.

In some embodiments, a rail-viewing-window state may be determined without a media object. For example, a rail-viewing-window state may be initiated by predetermined body movements of the wearer which may responsively trigger the rail-viewing-window state. Thereafter triggering the rail-viewing-window state, the viewing window may move as if on a rail even though no rail is viewable on the HMD.

In some embodiments, after determining the rail-viewing-window state associated with a rail, the rail may disappear from the display. In some instances, the rail may be displayed temporarily to indicate where the rail is but then disappear at some later point in time. Further, in some instance, predetermined body movements may provide a signal to the HMD to remove the rail from the display while maintaining the rail-viewing-window state.

iii. Receiving Second Head-Movement

In FIG. 3A, exemplary method 300 further involves receiving second head-movement data that is indicative of head movement from a third position of the HMD to a fourth position of the HMD, as shown by block 306. In some embodiments, the third position of the HMD may be the same as or different than the second position of the HMD as previously described for block 102 in FIG. 1A. Further, in some instances, the second head-movement data may be the same as or different than the first head-movement data as described with respect to block 102 in FIG. 1A.

In some embodiments, a direction indicated by the second head-movement may correspond to a parallel direction of the viewing window along the rail and can be used to control the viewing window's movement. For example, with reference to FIG. 1C, consider a scenario where arrow 110 is a rail. In this scenario, horizontal head-movement 122 may be a second head-movement parallel to arrow 110 and horizontal head-movement 122 may be used to control viewing window 116 and its direction along arrow 110. While the viewing window is fixed along a horizontal rail, other input movements along different dimensions (e.g., perpendicular directions) may be ignored by wearable computer 126.

iv. Determining Head Movement and Causing the Viewing Window to Move Corresponding to the Rail In FIG. 3A, exemplary method 300 further involves determining a portion of the head movement indicated by the second head-movement data that corresponds to the rail defined by the rail-viewing-window state, as shown by block 308. Yet further, exemplary method 300 involves causing the viewing window to move corresponding to the rail, as shown by block 310. In some embodiments, input head-movements from second head-movement data may cause the viewing window to slide along the rail. In particular of these embodiments, multiple objects on the rail may provide information (e.g., type of file, options to view, etc.) as the viewing window passes over them.

In some embodiments, a speed parameter may map a given amount of head movement to an amount of viewing window movement. More specifically, the sensitivity of the viewing window and/or pointer may be configured in terms of counts per inch (CPI), which includes the number of counts for the viewing window to move one inch on the graphic menu. To increase the amount of viewing window movement mapped to the given amount of body movement, the CPI may be increased when the viewing window determines a rail-viewing-window state. For example, in FIG. 3B, viewing window 314 may move faster along horizontal rail 316 with corresponding head movements as opposed to when the rail-viewing-window state is removed.

In some embodiments, a direction parameter may map a direction of head-movement to a direction of the viewing window's movement. For example, the direction parameter may be a software program utilizing the sensory configurations of the wearable computer to detect a direction of the second head-movement. More specifically, the second head-movement data may correspond to a direction of the viewing window which is perpendicular to the rail. In some instances, a velocity may also be included with the second head-movement data and this may take the viewing window off the rail and remove the rail-viewing-window state. In some instances, a velocity corresponding to the head-movement data may be compared to a perpendicular-direction-velocity threshold. Once this threshold is exceeded, the viewing window may be taken on the rail and the rail-viewing-window state may be removed.

Similar to the threshold velocity described above, the acceleration of the body movement may be compared with a threshold acceleration and once the acceleration threshold is exceeded, the viewing window may be taken on the rail and the rail-viewing-window state may be removed. Other possibilities may also exist.

Figure 3C:
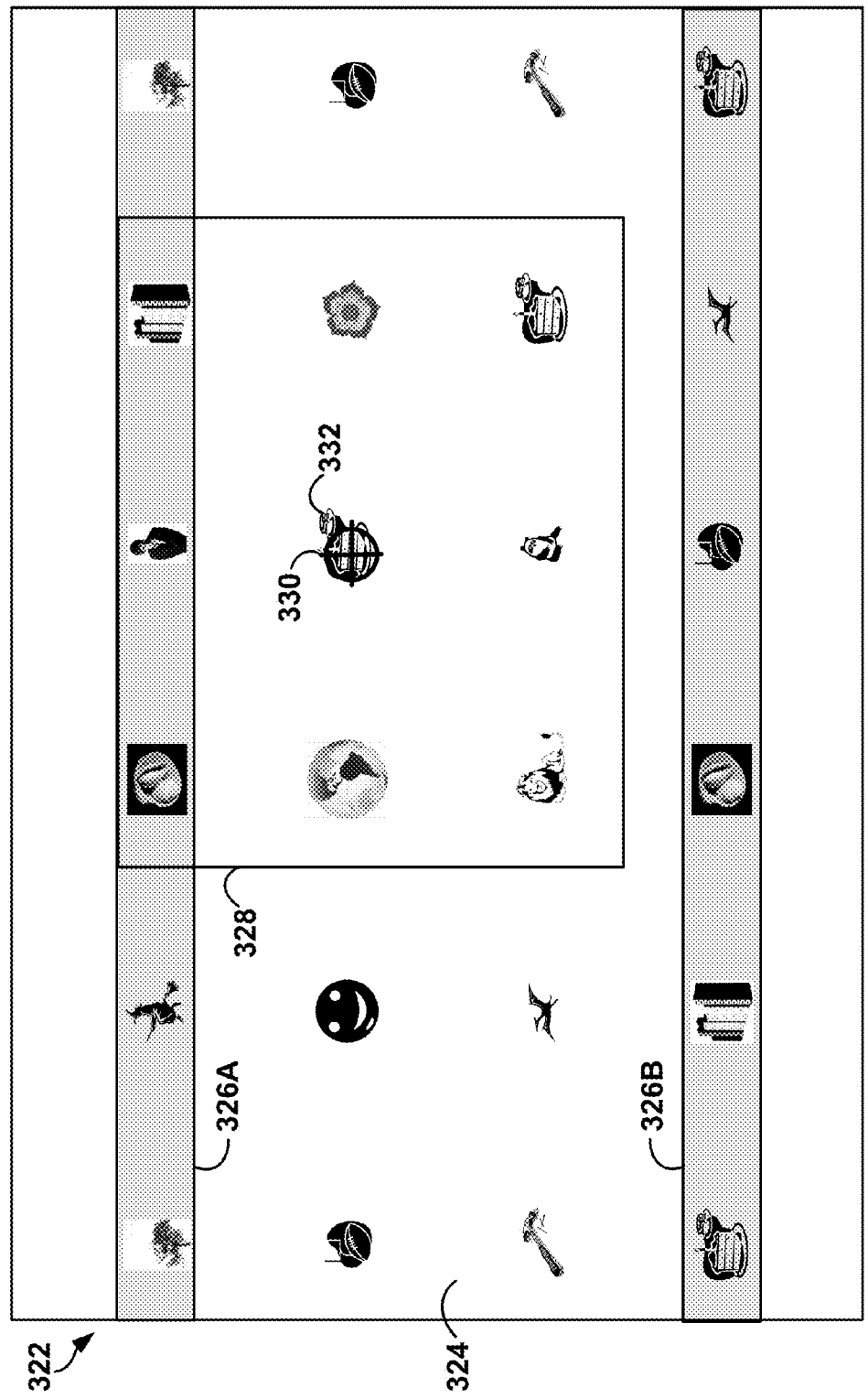
FIG. 3C illustrates a rail portion of a navigable area, according to an exemplary embodiment.

In some embodiments, the rail may define a rail portion of the navigable area allowing viewing window movement. For example, FIG. 3C illustrates a rail portion of a navigable area, according to an exemplary embodiment. In FIG. 3C, a rail may include upper rail 326A and lower rail 326B positioned in navigable area 322 to define rail portion 324.

Further, in some embodiments, causing the viewing window to move corresponding to the rail includes constraining the movement of the viewing window to be within the rail portion of the navigable area.

In some instances, the movement of the viewing window may be constrained by upper and lower rails in the navigable area. For example, in FIG. 3C, causing viewing window 328 to move may include constraining the movement of viewing window 328 to be within rail portion 324 of navigable area 322. In some instances, any head-movements that may correspond to moving viewing window 328 outside of rail portion 324 may be ineffective. In particular, viewing window 328 may be constrained from moving above upper rail 326A and below lower rail 326B.

In some embodiments, constraining the movement of the viewing window may allow the viewing window to overlap with a rail. For example, as illustrated in FIG. 3C, viewing window 328 may overlap with upper rail 326A. In some instances, viewing window 328 may also overlap with lower rail 326B. However, in some instances where viewing window 328 may overlap with upper rail 326A and/or lower rail 326B, selection icon 330 may be limited to move only within rail portion 324 in navigable area 322. In some instances, selection icon 330 may not overlap with either upper rail 326A and/or lower rail 326B. However, in some instances, selection icon 330 may overlap with upper rail 326A and/or lower rail 326B, perhaps to select an object. Other possibilities may also exist.

In some embodiments, the viewing window may move and the selection icon may position itself over a media object in the rail portion of the navigable area, perhaps selecting the media object. For example, in FIG. 3C, selection icon 330 may be fixed in the middle of viewing window 328 such that the movement of the selection icon 330 corresponds to the movement of viewing window 328. In some instances, viewing window 328 may move to a position as shown in FIG. 3C such that selection icon 330 is positioned over media object 332 in rail portion 324, perhaps selecting media object 332.

Figure 3D:
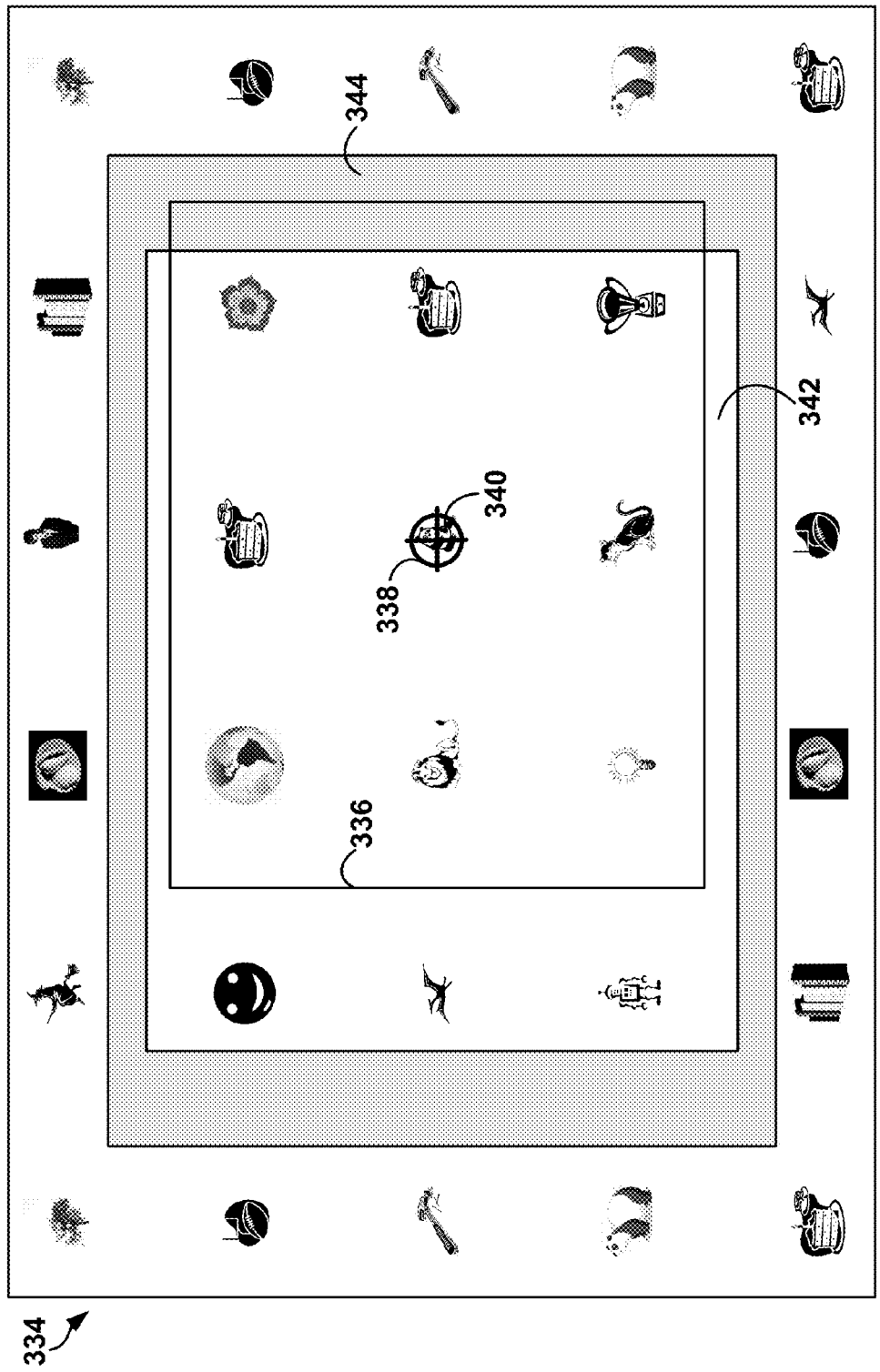
FIG. 3D illustrates an alternative rail portion of a navigable area, according to an exemplary embodiment.

In some instances, the movement of the viewing window may be constrained by an enclosed boundary in the navigable area. For example, FIG. 3D illustrates an alternative rail portion of a navigable area, according to an exemplary embodiment. In FIG. 3D, the movement of viewing window 336 may be constrained to be within rail portion 342 of navigable area 334. In some instances, any head-movements directed to move viewing window 336 outside of rail portion 342 may not be recognized.

As noted, constraining the movement of the viewing window may allow the viewing window to overlap with a rail. For example, as illustrated in FIG. 3D, viewing window 336 may overlap with rail 344. However, constraining the movement of viewing window 336 may keep selection icon 338 within rail portion 342.

In addition, as noted, the viewing window may move and position the selection icon over a media object in the rail portion of the navigable area, perhaps selecting the media object. For example, viewing window 336 may move to a position shown in FIG. 3D such that selection icon 338 is positioned over media object 340 in rail portion 342, perhaps selecting media object 340.

In some embodiments, the rail may be invisible to a wearer. For example in FIG. 3D, rail 344 may not be visible to a wearer of the HMD. However, in some instances, rail 344 may be visible to provide an indication of rail portion 342 in navigable area 334. In some instances, rail 344 may not visible to a wearer until viewing window 336 overlaps with rail 344 and/or rail portion 342. Other possibilities may also exist.

As noted, threshold velocities and accelerations associated with a rail may be implemented such that body movement may be compared with a threshold and once the threshold is exceeded, the viewing window may be removed from a rail portion in the navigable area. Other possibilities may also exist.

E. Exemplary Transparent Display

Figure 4:
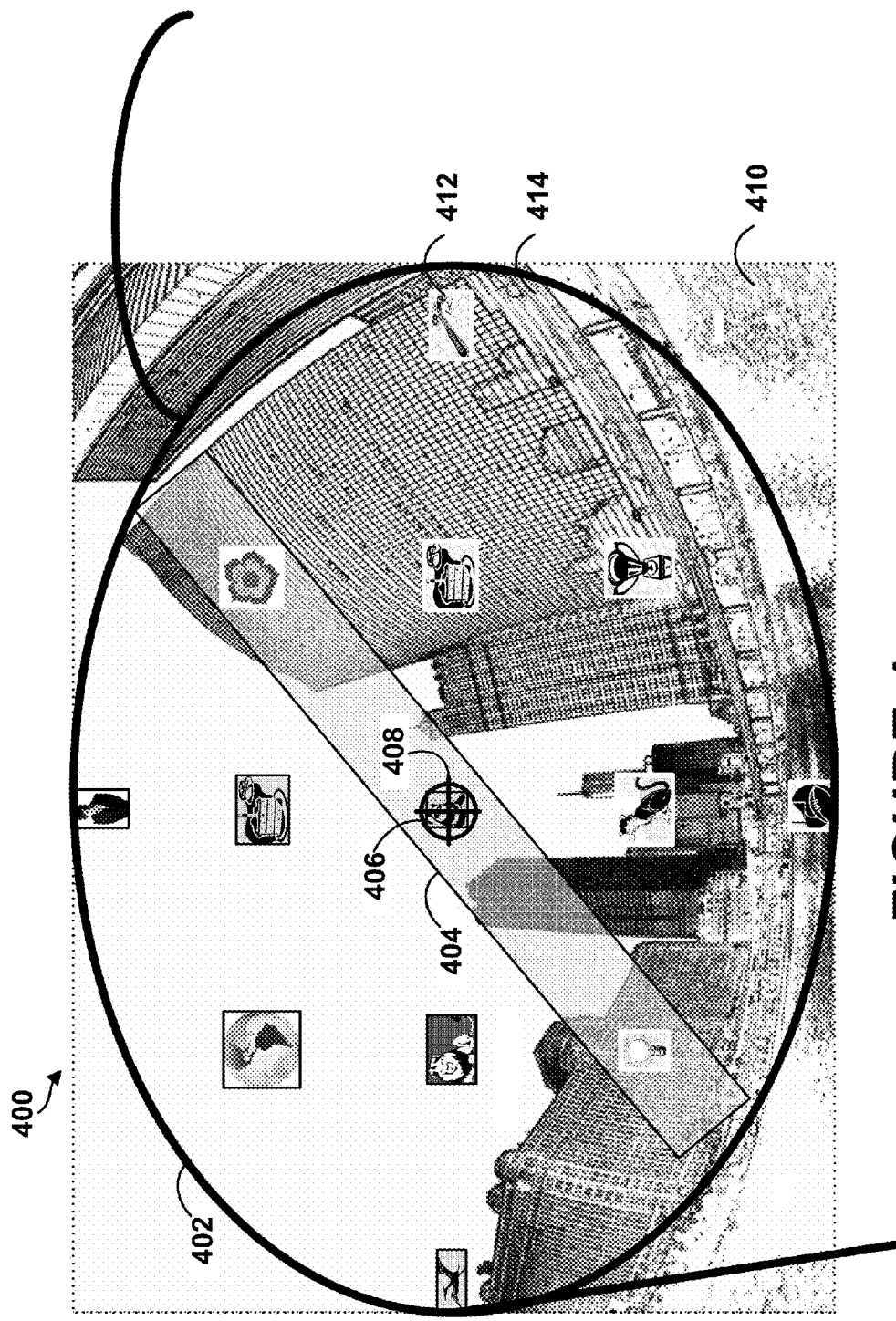
FIG. 4 illustrates a substantially transparent display, according to an exemplary embodiment.

FIG. 4 illustrates a substantially transparent display, according to an exemplary embodiment. In FIG. 4, an example system 400 is shown in the form of a wearable computing device. Viewing window 402 is defined by the left frame of wearable computing device such that viewing window 402 only captures a portion of navigable area 414. Further, multiple media objects, 404, 406, and 412 are shown in viewing window 402, where media object 404 is a rail cause viewing window 402 to determine a rail-viewing-window state. Further, in addition to or independently, media object 404 may also cause viewing window 402 to determine a gravity-viewing-window state. Pointer 408 is shown over media object 406, which may provide an indication of a selection. As illustrated, other media objects are shown in viewing window 402 by adapting to the background of physical world 410. For example, media object 412 is shown with a light background to illustrate a contrast with physical world 410.

F. Example System and Device Architecture

Figure 5A:
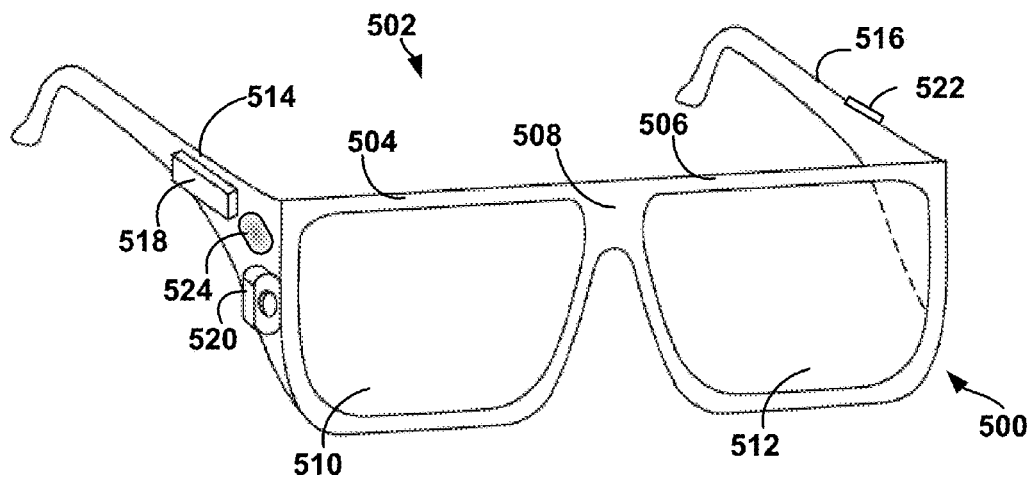
FIG. 5A illustrates a first example system for receiving, transmitting, and displaying data, according to an exemplary embodiment.

FIG. 5A illustrates a first example system 500 for receiving, transmitting, and displaying data. The system 500 is shown in the form of a wearable computing device. While FIG. 5A illustrates a head-mounted device 502 as an example of a wearable computing device, other types of wearable computing devices could additionally or alternatively be used. As illustrated in FIG. 5A, the head-mounted device 502 has frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements 510, 512.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be connected by wires or wirelessly connected to the head-mounted device 502). The on-board computing system 518 may include a processor and memory, for example. The on-board computing system 518 may be configured to receive and analyze data from the video camera 520, the sensor 522, and the finger-operable touch pad 524 (and possibly from other sensory devices, user-interfaces, or both) and generate images for output by the lens elements 510 and 512. The on-board computing system 518 may additionally include a speaker or a microphone for user input (not shown). An example computing system is further described below in connection with FIG. 8.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Video cameras with a small form-factor, such as those used in cell phones or webcams, for example, may be incorporated into an example embodiment of the system 500.

Further, although FIG. 5A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

Figure 5B:
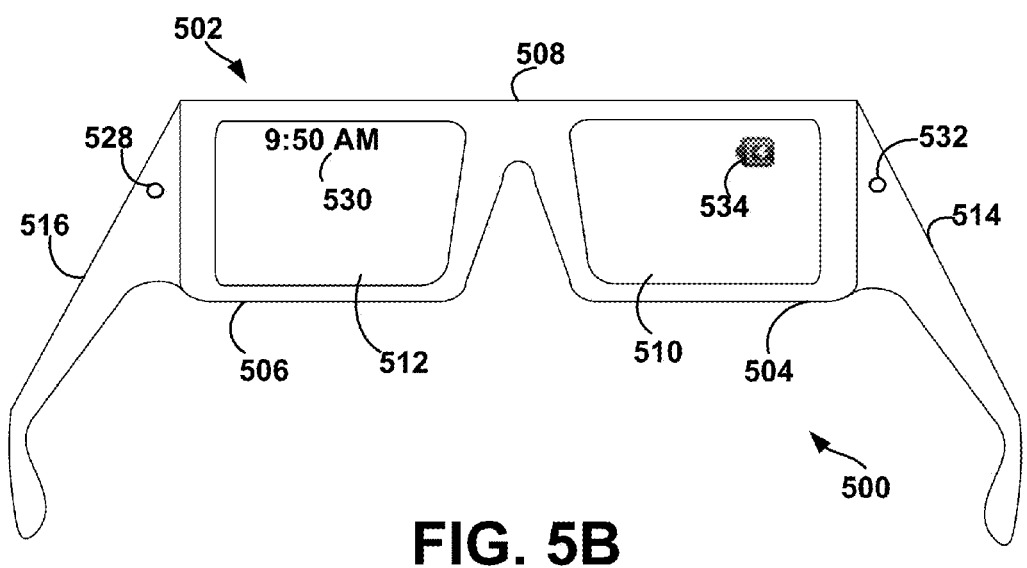
FIG. 5B illustrates an alternate view of the system illustrated in FIG. 5A, according to an exemplary embodiment.

FIG. 5B illustrates an alternate view of the system 500 illustrated in FIG. 5A. As shown in FIG. 5B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may be omitted (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or light emitting diode (LED) source and scanning system could be used to draw a raster display directly onto the retina of one or more of the user's eyes. Other possibilities exist as well.

Figure 6A:
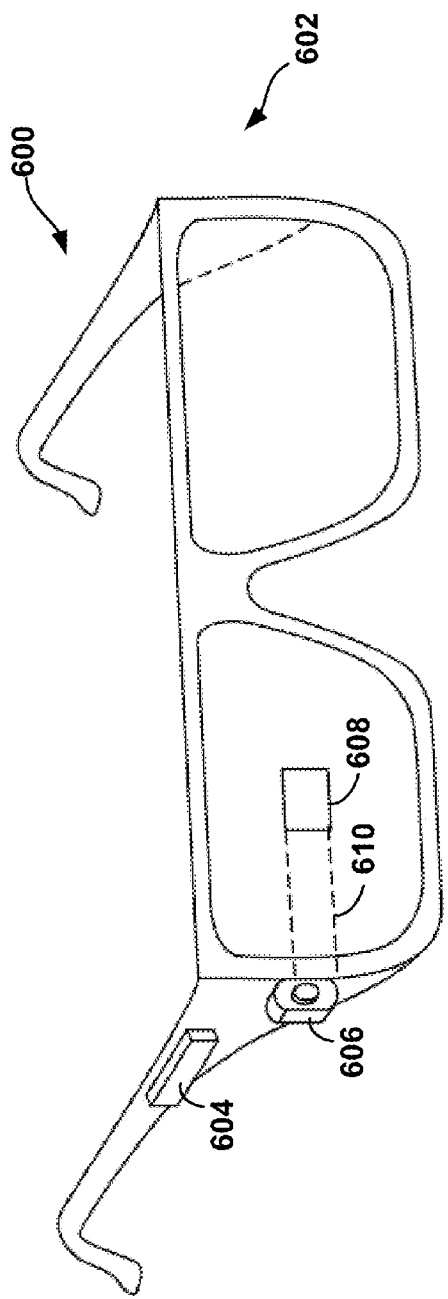
FIG. 6A illustrates a second example system for receiving, transmitting, and displaying data, according to an exemplary embodiment.

FIG. 6A illustrates a second example system 600 for receiving, transmitting, and displaying data. The system 600 is shown in the form of a wearable computing device 602. The wearable computing device 602 may include frame elements and side-arms such as those described with respect to FIGS. 5A and 5B. The wearable computing device 602 may additionally include an on-board computing system 604 and a video camera 606, such as those described with respect to FIGS. 5A and 5B. The video camera 606 is shown mounted on a frame of the wearable computing device 602; however, the video camera 606 may be mounted at other positions as well.

As shown in FIG. 6A, the wearable computing device 602 may include a single display 608 which may be coupled to the device. The display 608 may be formed on one of the lens elements of the wearable computing device 602, such as a lens element described with respect to FIGS. 5A and 5B, and may be configured to overlay computer-generated graphics in the user's view of the physical world. The display 608 is shown to be provided in a center of a lens of the wearable computing device 602, however, the display 608 may be provided in other positions. The display 608 is controllable via the computing system 604 that is coupled to the display 608 via an optical waveguide 610.

Figure 6B:
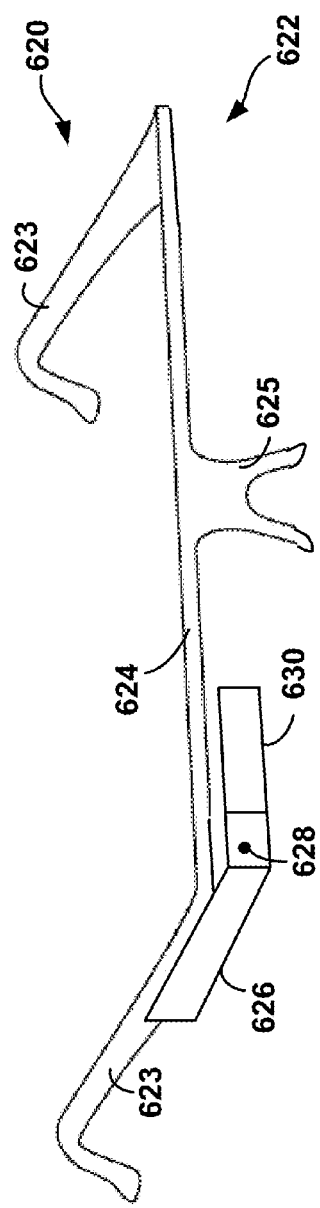
FIG. 6B illustrates a third example system for receiving, transmitting, and displaying data, according to an exemplary embodiment.

FIG. 6B illustrates a third example system 620 for receiving, transmitting, and displaying data. The system 620 is shown in the form of a wearable computing device 622. The wearable computing device 622 may include side-arms 623, a center frame support 624, and a bridge portion with nosepiece 625. In the example shown in FIG. 6B, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 5A and 5B.

The wearable computing device 622 may include a single lens element 630 that may be coupled to one of the side-arms 623 or the center frame support 624. The lens element 630 may include a display such as the display described with reference to FIGS. 5A and 5B, and may be configured to overlay computer-generated graphics upon the user's view of the physical world. In one example, the single lens element 630 may be coupled to a side of the extending side-arm 623. The single lens element 630 may be positioned in front of or proximate to a user's eye when the wearable computing device 622 is worn by a user. For example, the single lens element 630 may be positioned below the center frame support 624, as shown in FIG. 6B.

FIG. 7 shows a simplified block diagram of an example computer network infrastructure. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted device 502, 600, or 620 described with reference to FIGS. 5A-6B.

Thus, the device 710 may include a display system 712 comprising a processor 714 and a display 716. The display 716 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus, among other connections. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee technology, among other possibilities. Either of such a wired and/or wireless connection may be a proprietary connection as well. The remote device 730 may be accessible via the Internet and may include a computing cluster associated with a particular web service (e.g., social-networking, photo sharing, address book, etc.).

As described above in connection with FIGS. 5A-6B, an example wearable computing device may include, or may otherwise be communicatively coupled to, a computing system, such as computing system 518 or computing system 604.

Figure 8:
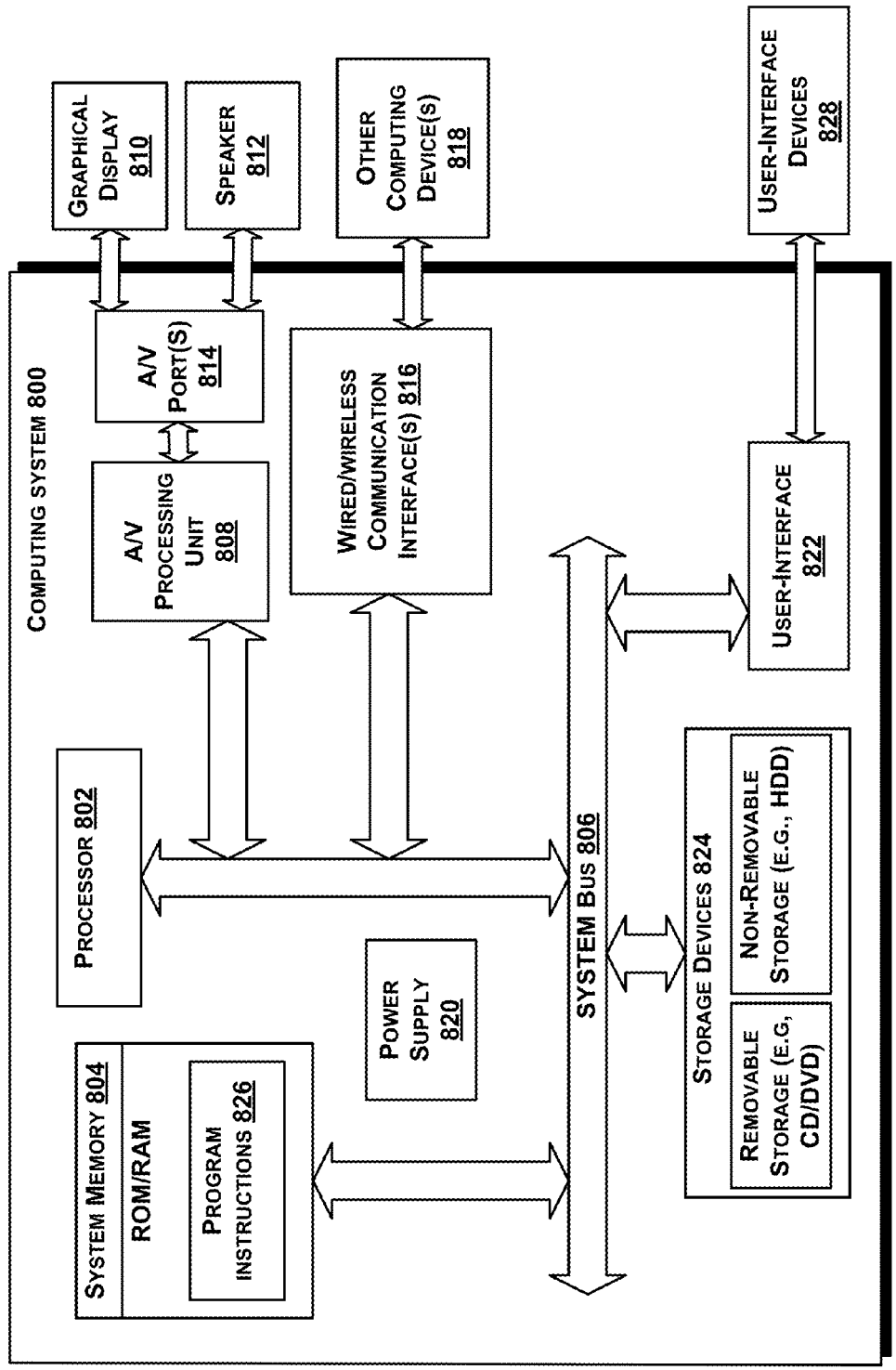
FIG. 8 shows a simplified block diagram depicting example components of an example computing system, according to an exemplary embodiment.

FIG. 8 shows a simplified block diagram depicting example components of an example computing system 800. One or both of the device 710 and the remote device 730 may take the form of computing system 800.

Computing system 800 may include at least one processor 802 and system memory 804. In an example embodiment, computing system 800 may include a system bus 806 that communicatively connects processor 802 and system memory 804, as well as other components of computing system 800. Depending on the desired configuration, processor 802 can be any type of processor including, but not limited to, a microprocessor (µP), a microcontroller (µC), a digital signal processor (DSP), or any combination thereof. Furthermore, system memory 804 can be of any type of memory now known or later developed including but not limited to volatile memory (such as RAM), non-volatile memory (such as ROM, flash memory, etc.) or any combination thereof.

An example computing system 800 may include various other components as well. For example, computing system 800 includes an A/V processing unit 808 for controlling graphical display 810 and speaker 812 (via A/V port 814), one or more communication interfaces 816 for connecting to other computing devices 818, and a power supply 820. Graphical display 810 may be arranged to provide a visual depiction of various input regions provided by user-interface module 822. For example, user-interface module 822 may be configured to provide a user-interface, such as the example user-interface described below in connection with FIGS. 9A-D, and graphical display 810 may be configured to provide a visual depiction of the user-interface. User-interface module 822 may be further configured to receive data from and transmit data to (or be otherwise compatible with) one or more user-interface devices 828.

Furthermore, computing system 800 may also include one or more data storage devices 824, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 800.

According to an example embodiment, computing system 800 may include program instructions 826 that are stored in system memory 804 (and/or possibly in another data-storage medium) and executable by processor 802 to facilitate the various functions described herein including, but not limited to, those functions described with respect to FIGS. 1A, 2A, and 3A. Although various components of computing system 800 are shown as distributed components, it should be understood that any of such components may be physically integrated and/or distributed according to the desired configuration of the computing system.

G. Example User-Interface

FIGS. 9A-D show aspects of an example user-interface 900. The user-interface 900 may be displayed by, for example, a wearable computing device as described above for FIGS. 5A-6B.

Figure 9A:
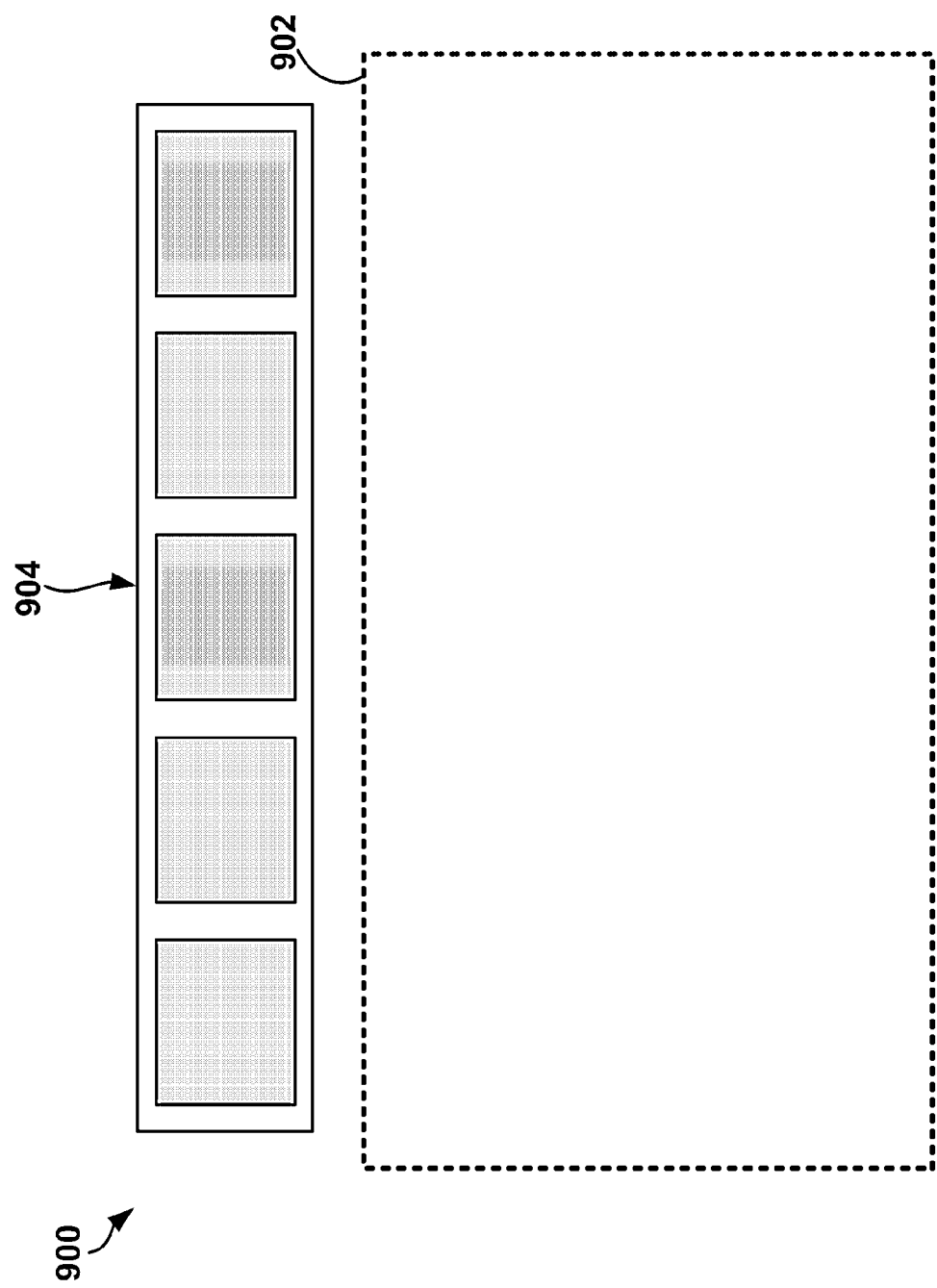
FIG. 9A shows aspects of an example user-interface, according to an exemplary embodiment.

An example state of the user-interface 900 is shown in FIG. 9A. The example state shown in FIG. 9A may correspond to a first position of the wearable computing device. That is, the user-interface 900 may be displayed as shown in FIG. 9A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 900 includes a viewing window 902. An example boundary of the viewing window 902 is shown by a dotted frame. While the viewing window 902 is shown to have a landscape shape (in which the viewing window 902 is wider than it is tall), in other embodiments the viewing window 902 may have a portrait or square shape, or may have a non-rectangular shape, such as a circular or elliptical shape. The viewing window 902 may have other shapes as well.

The viewing window 902 may be, for example, the viewable area between (or encompassing) the upper, lower, left, and right boundaries of a display on the wearable computing device. As shown, when the wearable computing device is in the first position, the viewing window 902 is substantially empty (e.g., completely empty) of user-interface elements, such that the user's view of their real-world environment is generally uncluttered, and objects in the user's environment are not obscured.

In some embodiments, the viewing window 902 may correspond to a field of view of a wearer of the wearable computing device, and an area outside the viewing window 902 may correspond to an area outside the field of view of the wearer. In other embodiments, the viewing window 902 may correspond to a non-peripheral portion of a field of view of a wearer of the wearable computing device, and an area outside the viewing window 902 may correspond to a peripheral portion of the field of view of the wearer. In still other embodiments, the user-interface 900 may be larger than or substantially the same as a field of view of a wearer of the wearable computing device, and the field of view of the wearer may be larger than or substantially the same size as the viewing window 902. The viewing window 902 may take other forms as well.

Accordingly, the portions of the user-interface 900 outside of the viewing window 902 may be outside of or in a peripheral portion of a field of view of a wearer of the wearable computing device. For example, as shown, a navigable area 904 may be outside of or in a peripheral portion of the field of view of the user in the user-interface 900. While the navigable area 904 is shown to be not visible in the viewing window 902, in some embodiments the navigable area 904 may be partially visible in the viewing window 902.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the viewing window 902 and the navigable area 904 to move such that the navigable area 904 becomes more visible in the viewing window 902. For example, the wearable computing device may cause the viewing window 902 to move upward and may cause the navigable area 904 to move downward. The viewing window 902 and the navigable area 904 may move the same amount, or may move different amounts. In one embodiment, the navigable area 904 may move further than the viewing window 902. As another example, the wearable computing device may cause only the navigable area 904 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 922 described above in connection with FIG. 9A. In some embodiments, the movement data may comprise a binary indication corresponding to the upward movement. In other embodiments, the movement data may comprise an indication corresponding to the upward movement as well as an extent of the upward movement. The movement data may take other forms as well.

Figure 9B:
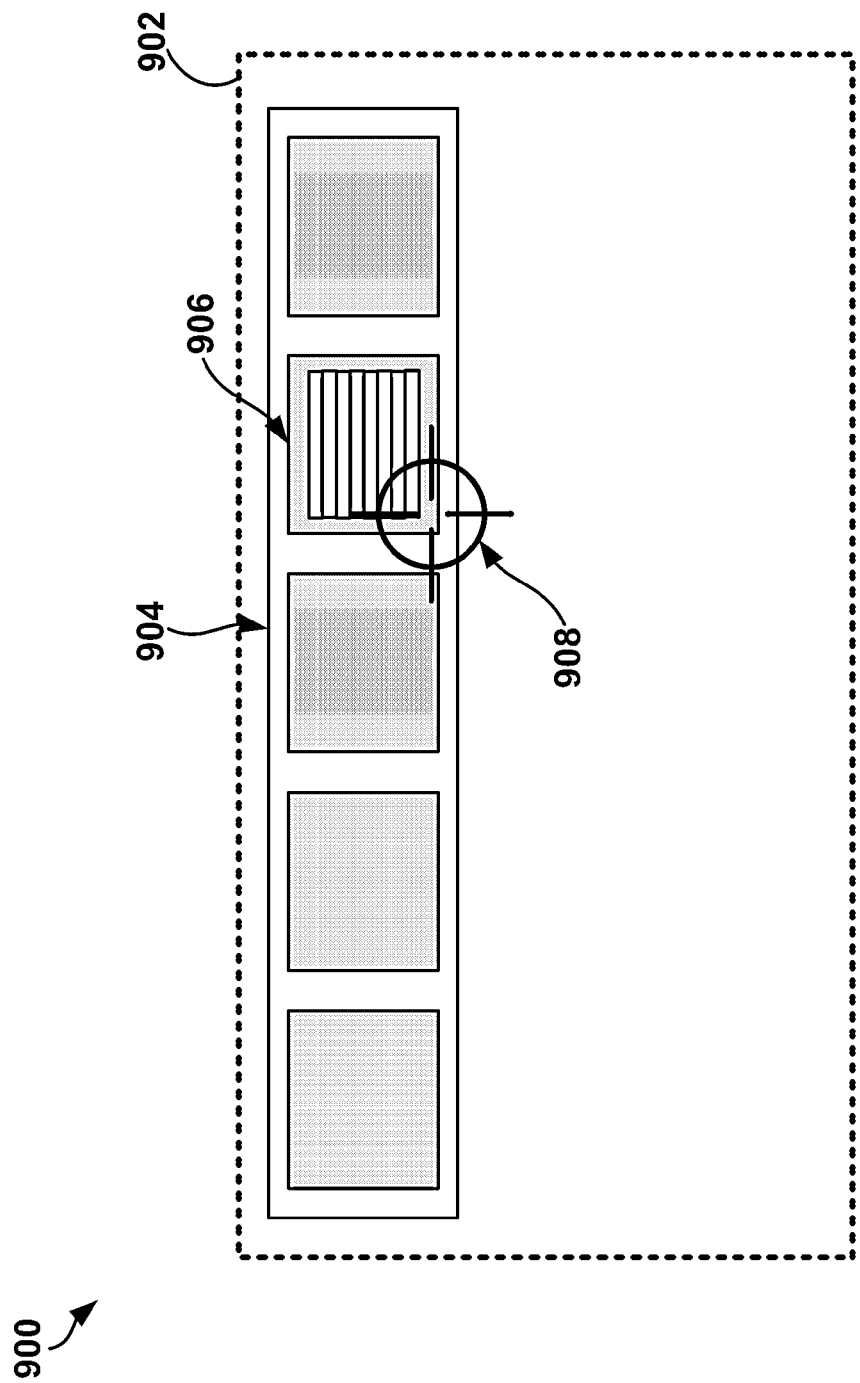
FIG. 9B shows aspects of an example user-interface after receiving movement data corresponding to an upward movement, according to an exemplary embodiment.

FIG. 9B shows aspects of an example user-interface after receiving movement data corresponding to an upward movement. As shown, the user-interface 900 includes the viewing window 902 and the navigable area 904.

As noted above, in response to receiving the movement data corresponding to an upward movement of the wearable computing device, the wearable computing device may move one or both of the viewing window 902 and the navigable area 904 such that the navigable area 904 becomes more visible in the viewing window 902.

As shown, the navigable area 904 is fully visible in the viewing window 902. In other embodiments, however, only a portion of the navigable area 904 may be visible in the viewing window 902. In some embodiments, the extent to which the navigable area 904 is visible in the viewing window 902 may be based at least in part on an extent of the upward movement.

Thus, the viewing window 902 may be moved in response to receiving data corresponding to an upward movement. In some embodiments, the viewing window 902 may be moved in an upward scrolling or panning motion. For instance, the viewing window 902 may appear to a wearer of the wearable computing device as if mapped onto the inside of a static sphere centered at the wearable computing device, and movement of the viewing window 902 may map onto movement of the real-world environment relative to the wearable computing device. A speed, acceleration, and/or magnitude of the upward scrolling may be based at least in part on a speed, acceleration, and/or magnitude of the upward movement. In other embodiments, the viewing window 902 may be moved by, for example, jumping between fields of view. In still other embodiments, the viewing window 902 may be moved only when the upward movement exceeds a threshold speed, acceleration, and/or magnitude. In response to receiving data corresponding to an upward movement that exceeds such a threshold or thresholds, the viewing window 902 may pan, scroll, slide, or jump to a new field of view. The viewing window 902 may be moved in other manners as well.

While the foregoing description focused on upward movement, it is to be understood that the wearable computing device could be configured to receive data corresponding to other directional movement (e.g., downward, leftward, rightward, etc.) as well, and that the viewing window 902 may be moved in response to receiving such data in a manner similar to that described above in connection with upward movement.

As shown, the navigable area 904 includes a number of content objects 906. In some embodiments, the content objects 906 may be arranged in a ring (or partial ring) around and above the head of a wearer of the wearable computing device. In other embodiments, the content objects 906 may be arranged in a dome-shape above the wearer's head. The ring or dome may be centered above the wearable computing device and/or the wearer's head. In other embodiments, the content objects 906 may be arranged in other ways as well.

The number of content objects 906 in the navigable area 904 may be fixed or may be variable. In embodiments where the number is variable, the content objects 906 may vary in size according to the number of content objects 906 in the navigable area 904. In embodiments where the content objects 906 extend circularly around a wearer's head, like a ring (or partial ring), only some of the content objects 906 may be visible at a particular moment. In order to view other content objects 904, a wearer of the wearable computing device may interact with the wearable computing device to, for example, rotate the content objects 906 along a path (e.g., clockwise or counterclockwise) around the wearer's head. To this end, the wearable computing device may be configured to receive data indicating such an interaction through, for example, a touch pad, such as finger-operable touch pad 924. Alternatively or additionally, the wearable computing device may be configured to receive such data through other input devices as well.

Depending on the application of the wearable computing device, the content objects 906 may take several forms. For example, the content objects 906 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 906 may take other forms as well.

In embodiments where the content objects 906 include tools, the tools may be located in a particular region of the navigable area 904, such as the center. In some embodiments, the tools may remain in the center of the navigable area 904, even if the other content objects 906 rotate, as described above. Tool content objects may be located in other regions of the navigable area 904 as well.

The particular content objects 906 that are included in navigable area 904 may be fixed or variable. For example, the content objects 906 may be preselected by a wearer of the wearable computing device. In another embodiment, the content objects 906 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 906 may fixed, while the content objects 906 may be variable. The content objects 906 may be selected in other manners as well.

Similarly, an order or configuration in which the content objects 906 are displayed may be fixed or variable. In one embodiment, the content objects 906 may be pre-ordered by a wearer of the wearable computing device. In another embodiment, the content objects 906 may be automatically ordered based on, for example, how often each content object 906 is used (on the wearable computing device only or in other contexts as well), how recently each content object 906 was used (on the wearable computing device only or in other contexts as well), an explicit or implicit importance or priority ranking of the content objects 906, and/or other criteria.

In some embodiments, the wearable computing device may be further configured to receive from the wearer a selection of a content object 906 from the navigable area 904. To this end, the user-interface 900 may include a cursor 908, shown in FIG. 9B as a reticle, which may be used to navigate to and select content objects 906 from the navigable area 904. In some embodiments, the cursor 908 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 922, or may be included in a peripheral device communicatively coupled to the wearable computing device. As another example, the selection data may be (or may be derived from) data received from a touch pad, such as the finger-operable touch pad 924 described above in connection with FIG. 9A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 908 to the content object 906 using one or more predetermined movements. In order to select the content object 906, the wearer may perform an additional predetermined movement, such as holding the cursor 908 over the content object 906 for a predetermined period of time. The wearer may select the content object 906 in other manners as well.

Figure 9C:
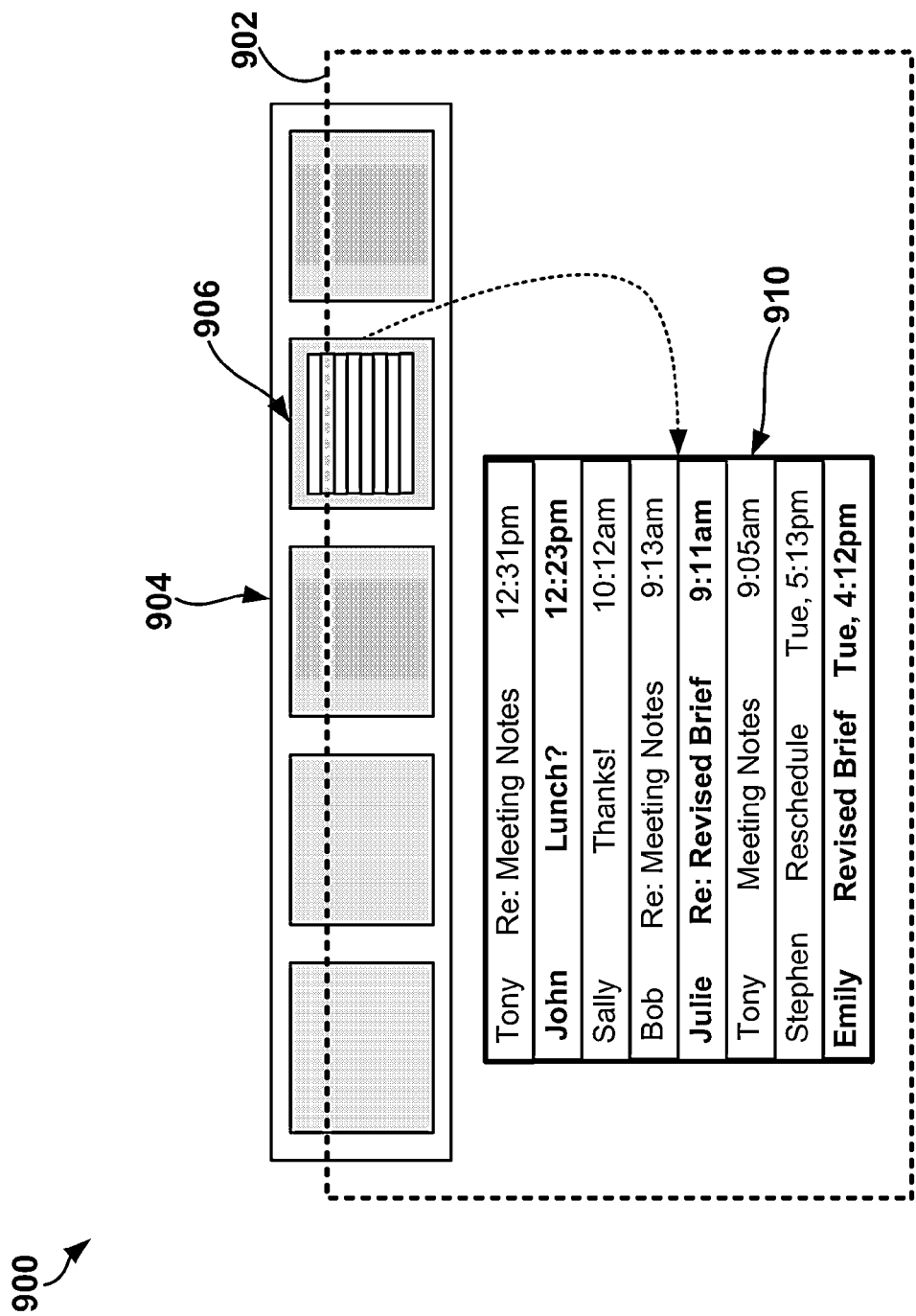
FIG. 9C shows aspects of an example user-interface after selection of a selected content object, according to an exemplary embodiment.

Once a content object 906 is selected, the wearable computing device may cause the content object 906 to be displayed in the viewing window 902 as a selected content object. FIG. 9C shows aspects of an example user-interface after selection of a selected content object, in accordance with an embodiment.

As indicated by the dotted arrow, the content object 906 is displayed in the viewing window 902 as a selected content object 910. As shown, the selected content object 910 is displayed larger and in more detail in the viewing window 902 than in the navigable area 904. In other embodiments, however, the selected content object 910 could be displayed in the viewing window 902 smaller than or the same size as, and in less detail than or the same detail as, the navigable area 904. In some embodiments, additional content (e.g., actions to be applied to, with, or based on the selected content object 910, information related to the selected content object 910, and/or modifiable options, preferences, or parameters for the selected content object 910, etc.) may be showed adjacent to or nearby the selected content object 910 in the viewing window 902.

Once the selected content object 910 is displayed in the viewing window 902, a wearer of the wearable computing device may interact with the selected content object 910. For example, as the selected content object 910 is shown as an email inbox, the wearer may wish to read one of the emails in the email inbox. Depending on the selected content object, the wearer may interact with the selected content object in other ways as well (e.g., the wearer may locate additional information related to the selected content object 910, modify, augment, and/or delete the selected content object 910, etc.). To this end, the wearable computing device may be further configured to receive input data corresponding to one or more predetermined movements indicating interactions with the user-interface 900. The input data may take any of the forms described above in connection with the selection data.

Figure 9D:
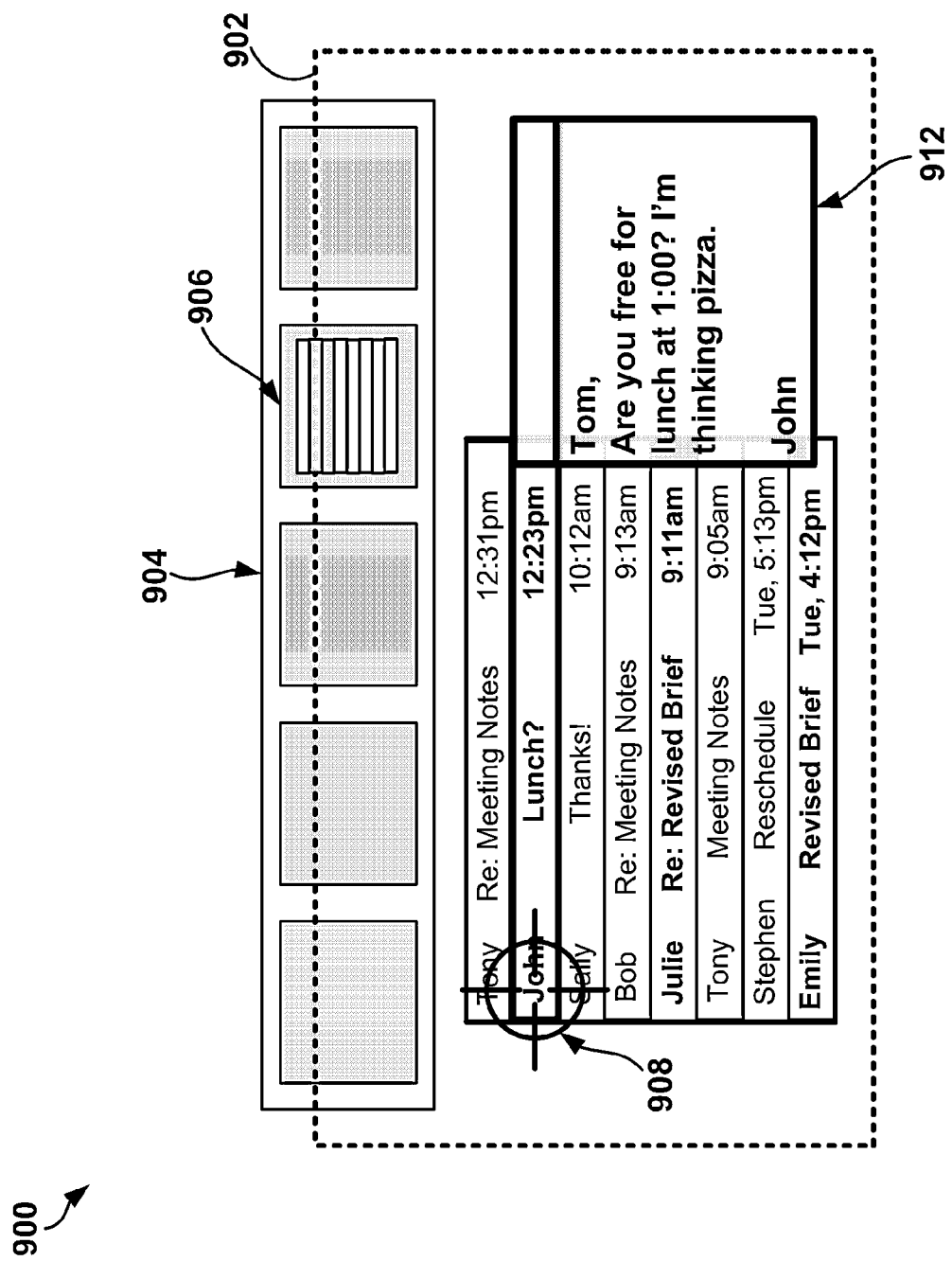
FIG. 9D shows aspects of an example user-interface after receiving input data corresponding to a user input, according to an exemplary embodiment.

FIG. 9D shows aspects of an example user-interface after receiving input data corresponding to a user input, in accordance with an embodiment. As shown, a wearer of the wearable computing device has navigated the cursor 908 to a particular subject line in the email inbox and selected the subject line. As a result, the email 912 is displayed in the viewing window, so that the wearer may read the email 912. The wearer may interact with the user-interface 900 in other manners as well, depending on, for example, the selected content object.

It should be further understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. A system comprising:
   a non-transitory computer readable medium; and
   program instructions stored on the non-transitory computer readable medium and executable by at least one processor to:
   cause a head-mounted display (HMD) to provide (i) a viewing window that is fully visible in a field of view of the HMD, (ii) a navigable area that is not fully visible in a field of view of the HMD, wherein the viewing window displays a first portion of the navigable area, and (iii) at least one media object, wherein the at least one media object is associated with at least one viewing-window state;
   receive first head-movement data that is indicative of head movement from a first position of the HMD to a second position of the HMD; and
   based on at least (i) the first head-movement data, (ii) the at least one viewing-window state associated with the at least one media object, and (iii) a determination that at least one threshold velocity has been exceeded, cause the viewing window to display a second portion of the navigable area, wherein the second portion includes the at least one media object.

2. The system of claim 1, wherein the at least one media object is associated with at least a gravity-viewing-window state, the system further comprising program instructions stored on the non-transitory computer readable medium and executable by at least one processor to:
   determine that the at least one viewing-window state is the gravity-viewing-window state associated with the media object; and
   cause the viewing window to fixate upon the media object.

3. The system of claim 2, wherein the at least one threshold velocity corresponds to the gravity-viewing-window state, the system further comprising program instructions stored on the non-transitory computer-readable medium and executable by at least one processor to:
   while the viewing window is fixated upon the media object, receive second head-movement data;
   determine that a velocity corresponding to the second head-movement data is greater than the at least one threshold velocity; and
   based on the determination, cause the viewing window to move away from the media object.

4. The system of claim 1, wherein the at least one media object is associated with at least a rail-viewing-window state, the system further comprising program instructions stored on the non-transitory computer readable medium and executable by at least one processor to:
   after causing the viewing window to display the second portion of the navigable area, receive input-selection data indicating a selection of the at least one media object;
   based on the selection of the at least one media object, determine that the at least one viewing-window state is the rail-viewing-window state associated with the at least one media object;
   receive second head-movement data that is indicative of head movement from a third position of the HMD to a fourth position of the HMD;
   determine a portion of the head movement indicated by the second head-movement data that corresponds to a rail defined by the rail-viewing-window state; and
   after the determination, cause the viewing window to move corresponding to the rail.

5. The system of claim 4, wherein a direction parameter maps a parallel direction indicated by the second head-movement data to a viewing-window direction along the rail, the system further comprising program instructions stored on the non-transitory computer readable medium and executable by at least one processor to:
   after determining the at least one viewing-window state is the rail-viewing-window state, use the parallel direction indicated by second head-movement to control the viewing-window direction along the rail.

6. The system of claim 5, wherein the direction parameter maps a perpendicular direction indicated by the second head-movement data to a viewing-window direction perpendicular to the rail, and wherein the at least one threshold velocity comprises a perpendicular-direction-velocity threshold, the system further comprising program instructions stored on the non-transitory computer-readable medium and executable by at least one processor to:
   determine that a velocity corresponding to the perpendicular direction in the second head-movement data exceeds the perpendicular-direction-velocity threshold; and
   after the determination, cause the viewing window to move perpendicular to the rail.

7. The system of claim 4, wherein a speed parameter maps a given amount of head movement to an amount of viewing window movement, the system further comprises program instructions stored on the non-transitory computer-readable medium and executable by at least one processor to:
   after determining the at least one viewing-window state is the rail-viewing-window state, increase the speed parameter so as to increase the amount of viewing window movement that is mapped to the given amount of head movement.

8. The system of claim 4, wherein the rail defines a rail portion of the navigable area allowing viewing window movement, and wherein causing the viewing window to move corresponding to the rail comprises constraining the movement of the viewing window to be within the rail portion of the navigable area.

9. A computer-implemented method comprising:
   causing a head-mounted display (HMD) to provide (i) a viewing window that is fully visible in a field of view of the HMD, (ii) a navigable area that is not fully visible in a field of view of the HMD, wherein the viewing window displays a first portion of the navigable area, and (iii) at least one media object, wherein the at least one media object is associated with at least one viewing-window state;

receiving first head-movement data that is indicative of head movement from a first position to a second position; and based on at least (i) the first head-movement data, (ii) the at least one viewing-window state associated with the at least one media object, and (iii) a determination that at least one threshold velocity has been exceeded, causing the viewing window to display a second portion of the navigable area, wherein the second portion includes the at least one media object.

10. The method of claim 9, wherein (i) the viewing window, (ii) the navigable area, and (iii) the at least one media object are provided through the HMD, and wherein the head movement comprises movement of human eyes.

11. The method of claim 9, wherein the at least one media object is associated with at least a gravity-viewing-window state, the method further comprises:

determining that the at least one viewing-window state is the gravity-viewing-window state associated with the media object; and causing the viewing window to fixate upon the media object.

12. The method of claim 10, wherein the at least one threshold velocity comprises a threshold acceleration, and wherein determining the at least one viewing-window state is a gravity-viewing-window state associated with the gravity object comprises:

while the viewing window is fixated upon the media object, receiving second head-movement data;

determining that an acceleration corresponding to the second head-movement data is greater than the threshold acceleration; and based on the determination, causing the viewing window to move away from the media object.

13. The method of claim 9, wherein the at least one media object is associated with at least a rail-viewing-window state, the method further comprises:

after causing the viewing window to display the second portion of the navigable area, receiving input-selection data indicating a selection of the at least one media object;

based on the selection of the at least one media object, determining that the at least one viewing-window state is a rail-viewing-window state associated with the at least one media object;

receiving second head-movement data that is indicative of head movement from a third position of the HMD to a fourth position of the HMD;

determining a portion of the head movement indicated by the second head-movement data that corresponds to a rail defined by the rail-viewing-window state; and after the determination, causing the viewing window to move corresponding to the rail.

14. The method of claim 13, wherein a direction parameter maps a parallel direction indicated by the second head-movement data to a viewing-window direction along the rail, the method further comprises:

after determining the at least one viewing-window state is the rail-viewing-window state, using the parallel direction indicated by second head-movement to control the viewing-window direction along the rail.

15. The method of claim 13, wherein the direction parameter maps a perpendicular direction indicated by the second head-movement data to a viewing-window direction perpendicular to the least rail, and wherein the at least one threshold velocity comprises a perpendicular-direction-velocity threshold, the method further comprises:

determining that a velocity corresponding to the perpendicular direction in the second head-movement data exceeds the perpendicular-direction-velocity threshold; and after the determination, causing the viewing window to move perpendicular to the rail.

16. The method of claim 13, wherein a speed parameter maps a given amount of head movement to an amount of viewing window movement, the method further comprises:

after determining the at least one viewing-window state is the rail-viewing-window state, increasing the speed parameter so as to increase the amount of viewing window movement that is mapped to the given amount of head movement.

17. The method of claim 13, wherein the rail defines a rail portion of the navigable area allowing viewing window movement, and wherein causing the viewing window to move corresponding to the rail comprises constraining the movement of the viewing window to be within the rail portion of the navigable area.

18. A non-transitory computer-readable medium having instructions stored thereon, the instructions comprising:

instructions for causing a head-mounted display (HMD) to provide (i) a viewing window that is fully visible in a field of view of the HMD, (ii) a navigable area that is not fully visible in a field of view of the HMD, wherein the viewing window displays a first portion of the navigable area, and (iii) at least one media object, wherein the at least one media object is associated with at least one viewing-window state;

instructions for receiving first body-movement data that is indicative of body movement from a first position to a second position; and instructions for, based on at least (i) the first body-movement data, (ii) the at least one viewing-window state associated with the at least one media object, and (iii) a determination that at least one threshold velocity has been exceeded, causing the viewing window to display a second portion of the navigable area, wherein the second portion includes the at least one media object.

19. The non-transitory computer-readable medium of claim 18, wherein the at least one media object is associated with at least a gravity-viewing-window state, the non-transitory computer-readable medium further includes instructions for:

determining that the at least one viewing-window state is the gravity-viewing-window state associated with the media object; and causing the viewing window to fixate upon the media object.

20. The non-transitory computer-readable medium of claim 19, wherein determining the at least one viewing-window state is a gravity-viewing-window state associated with the gravity object, wherein the at least one threshold velocity corresponds to the gravity-viewing-window state, the non-transitory computer-readable medium further includes instructions for:

while the viewing window is fixated upon the media object, receiving second head-movement data;

determining that a velocity corresponding to the second head-movement data is greater than the at least one threshold velocity; and based on the determination, causing the viewing window to move away from the media object.

21. The non-transitory computer-readable medium of claim 18, wherein the at least one media object is associated with at least a rail-viewing-window state, the non-transitory computer-readable medium further includes instructions for:
   after causing the viewing window to display the second portion of the navigable area, receiving input-selection data indicating a selection of the at least one media object;
   based on the selection of the at least one media object, determining that the at least one viewing-window state is a rail-viewing-window state associated with the at least one media object;
   receiving second head-movement data that is indicative of head movement from a third position of the HMD to a fourth position of the HMD;
   determining a portion of the head movement indicated by the second head-movement data that corresponds to a rail defined by the rail-viewing-window state; and
   after the determination, causing the viewing window to move corresponding to the rail.

22. The non-transitory computer-readable medium of claim 21, wherein a direction parameter maps a parallel direction indicated by the second head-movement data to a viewing-window direction along the rail, the non-transitory computer-readable medium further includes instructions for:
   after determining the at least one viewing-window state is the rail-viewing-window state, using the parallel direction indicated by second head-movement to control the viewing window direction along the rail.

23. The non-transitory computer-readable medium of claim 22, wherein the direction parameter maps a perpendicular direction indicated by the second head-movement data to a viewing-window direction perpendicular to the rail, and wherein the at least one threshold velocity comprises a perpendicular-direction-velocity threshold, the non-transitory computer-readable medium further includes instructions for:
   determining that a velocity corresponding to the perpendicular direction in the second head-movement data exceeds the perpendicular-direction-velocity threshold; and
   after the determination, causing the viewing window to move perpendicular to the rail.

24. The non-transitory computer-readable medium of claim 21, wherein a speed parameter maps a given amount of head movement to an amount of viewing window movement, the non-transitory computer-readable medium further includes instructions for:
   after determining the at least one viewing-window state is the rail-viewing-window state, increasing the speed parameter so as to increase the amount of viewing window movement that is mapped to the given amount of head movement.

25. The non-transitory computer-readable medium of claim 21, wherein the rail defines a rail portion of the navigable area allowing viewing window movement, and wherein causing the viewing window to move corresponding to the rail comprises constraining the movement of the viewing window to be within the rail portion of the navigable area.

\* \* \* \* \*